US005632698A

United States Patent [19]

Suzuki

[11] Patent Number: 5,632,698
[45] Date of Patent: May 27, 1997

[54] AUTOTENSIONER

[75] Inventor: Hiroshi Suzuki, Fujisawa, Japan

[73] Assignee: NSK, Ltd., Tokyo, Japan

[21] Appl. No.: 521,722

[22] Filed: Aug. 31, 1995

[30] Foreign Application Priority Data

Aug. 31, 1994 [JP] Japan .................. 6-206858

[51] Int. Cl.⁶ .................................................. F16H 7/08
[52] U.S. Cl. .................................... 474/110; 474/135
[58] Field of Search .............................. 474/110, 117, 474/135

[56] References Cited

U.S. PATENT DOCUMENTS

| | | | |
|---|---|---|---|
| 3,722,640 | 3/1973 | Taylor | 188/316 |
| 4,539,001 | 9/1985 | Okabe | 474/110 X |
| 4,838,839 | 6/1989 | Watanabe et al. | 474/135 |
| 4,904,230 | 2/1990 | Kawashima et al. | 474/112 |
| 4,973,290 | 11/1990 | Hans et al. | 474/117 |
| 5,104,359 | 4/1992 | Shirai et al. | 474/110 |
| 5,181,889 | 1/1993 | Maruyama et al. | 474/110 |
| 5,186,689 | 2/1993 | Yamamoto et al. | 474/117 X |
| 5,186,690 | 2/1993 | Yamamoto | 474/135 |
| 5,207,620 | 5/1993 | Yamamoto et al. | 474/135 |
| 5,352,160 | 10/1994 | Sakai et al. | 474/117 |
| 5,458,542 | 10/1995 | Sakai et al. | 474/135 |
| 5,480,358 | 1/1996 | Sakai et al. | 474/135 X |

FOREIGN PATENT DOCUMENTS

| | | |
|---|---|---|
| 2609769 | 7/1988 | France . |
| 2634531 | 1/1990 | France . |
| 4027171 | 4/1991 | Germany . |
| 58-121344 | 1/1983 | Japan . |
| 60-023355 | 2/1985 | Japan . |
| 61-294249 | 12/1986 | Japan . |
| 61-294250 | 12/1986 | Japan . |
| 62-271910 | 11/1987 | Japan . |
| 62-274142 | 11/1987 | Japan . |
| 62-274143 | 11/1987 | Japan . |
| 62-274144 | 11/1987 | Japan . |
| 63-180759 | 7/1988 | Japan . |
| 63-048842 | 12/1988 | Japan . |
| 1-100953 | 7/1989 | Japan . |
| 2-89839 | 3/1990 | Japan . |
| 4-17543 | 2/1992 | Japan . |
| 5-042801 | 6/1993 | Japan . |
| 6-047757 | 6/1994 | Japan . |
| 6-87758 | 12/1994 | Japan . |
| 2020778 | 11/1979 | United Kingdom . |
| WO83/00731 | 3/1983 | WIPO . |

*Primary Examiner*—Roger J. Schoeppel
*Attorney, Agent, or Firm*—Evenson, McKeown, Edwards & Lenahan P.L.L.C.

[57] ABSTRACT

A pulley pivotable on the swinging member is pressed against a timing belt by the resilient force of a tension coil spring, and the retracting action of the pulley is made slow by the damper unit, having a cylinder and piston in the cylinder wherein a leak gap between the inner peripheral surface of the cylinder and the outer peripheral surface of the piston is controlled to have a larger vibration prevention effect for the timing belt.

13 Claims, 24 Drawing Sheets

AUTOTENSIONER

BACKGROUND OF THE INVENTION

1. Field of the Invention

The present invention relates to an autotensioner used for applying an appropriate tension to a timing belt of an automotive engine.

2. Description of the Related Art

Drive units which use a timing belt or poly-V belt for driving a camshaft of an engine in synchronous timing with the crank shaft are widely known.

The timing belt has an inner peripheral face formed with teeth, so that these teeth are engaged with the teeth formed on the outer peripheral face of the drive and follower pulleys.

With this type of timing belt, it is necessary to apply an appropriate tension to prevent so-called "tooth-jump" with creep of the teeth on the inner peripheral face of the timing belt relative to the teeth on the outer peripheral face of the drive pulley and follower pulley due to e.g. temperature changes.

It is therefore common to use an autotensioner which presses a pulley against the outer peripheral face of the timing belt under resilient spring force to thereby maintain a constant tension in the timing belt irrespective of temperature changes.

An autotensioner used for this purpose must achieve the following functions (1) and (2):

(1) the autotensioner must be able to press resiliently against the outer peripheral face of the timing belt so as to apply an appropriate tension to the timing belt , and (2) when the tension in part of the timing belt at the portion pressed by the pulley rises suddenly, the autotensioner must be able to press strongly against that portion, without retreating immediately, to thus prevent the tension in the other parts of the belt being excessively reduced.

An autotensioner is therefore provided with a spring to ensure the above function (1), and a damper unit to ensure function (2).

For the damper unit, there is the so-called one way configured unit such as disclosed in Japanese Patent First Publication KOKAI No. S63-180759, having a damper function in both directions. However, in order to further decrease tension fluctuations in the timing belt, it is preferable to have a so-called two way configured unit with a damping function in one direction only, so that the pulley pressing against the timing belt can be rapidly displaced in the direction of pressure and gradually displaced in the opposite direction.

Japanese Utility Model First Publication KOKAI No. 60-23355 discloses a construction as shown in FIGS. 1 and 2, for an autotensioner incorporating such a two way configured damper unit.

FIG. 1 shows a timing belt drive unit with an autotensioner 4 fitted in it. Rotation of an engine crank shaft is transmitted from a drive pulley 1 to a timing belt 2, to thereby rotate follower pulleys 3 and cam shafts (not shown in the figure) fixed to respective ends of the follower pulleys 3. A follower pulley 3a is provided for driving auxiliary machinery of a water pump and the like.

The autotensioner 4 has a pulley 5 which is resiliently pressed against a portion of the timing belt 2 at a central part between the drive pulley 1 and the follower pulley 3, to thereby apply an appropriate tension to the timing belt 2.

The pulley 5 is pivotally supported by a second shaft (not shown in the figure) at a central portion of a swinging member 6.

The swinging member 6 is also referred to as pivotal member or rocking member.

The swinging member 6 is pivotally supported on a fixed portion or front face of the engine cylinder block (not shown) by means of a first shaft or pivot shaft 7.

Moreover, a damper unit 9 as shown in detail in FIG. 2, is provided between a bearing portion 8 on a tip end of the swinging member 6, and the front face of the cylinder block (not shown).

The damper unit 9 is fixed, for example to the front face of the cylinder block (not shown), at a portion separate from the swinging member 6, and exerts a resilient force in a direction of extension in overall length, based on the resilient force of a compression spring 11 housed in a cylinder 10, so that the pulley 5 is resiliently pressed towards the timing belt 2, under the resilient force of the compression spring 11.

Moreover, due to the actions of a viscous liquid 12 sealed inside the cylinder 10, and of a check valve 13, the damper unit 9 extends rapidly but contracts gradually. Accordingly, the autotensioner 4 satisfies the beforementioned functions (1), (2).

With the autotensioner 4 shown in FIGS. 1 and 2, since the resilient force for pressing the pulley 5 against the timing belt 2 comes from the compression spring 11 housed inside the damper unit 9, the damper unit 9 is relatively large. That is to say, in order to apply a sufficient tension to the timing belt 2, the resilient force of the compression spring 11 must be large, and since in general this resilient force must be maintained at around 10 to 20 kgf, it is difficult to avoid having a large compression spring 11 (in length and diameter). The damper unit 9 in which the compression spring 11 is housed thus becomes large (in length and diameter), so that it becomes difficult to install an autotensioner 4 incorporating such a large damper unit 9 in a limited installation space, for example at the front face of the cylinder block.

The damper unit 9 of the conventional construction shown in FIGS. 1 and 2 also lacks universal application, requiring a large variety of damper units 9 to suit autotensioners for different kinds of engines, resulting in an increase in manufacturing costs of the autotensioner 4, due to the complexity of component manufacture and component management. That is to say, not only does the set value for the tension of the timing belt 2 change with engine displacement, but also there are subtle differences, due for example to the engine type (whether OHC or DOHC). Accordingly, it is necessary to change the resilient force of the compression spring 11 to suit the set value. However, when the resilient force is changed, the length and diameter of the compression spring 11 become different. Therefore, the size of the damper unit 9 in which the compression spring 11 is housed is variously changed depending on the different set values, causing an increase in the abovementioned manufacturing costs.

To address this problem Japanese Utility Model First Publication KOKAI No. 06-47757 discloses an autotensioner such as shown in FIGS. 3 to 5 having a construction wherein a common damper unit is possible for configurations having different set values for the tension, and also the damper unit can be of small size. A damper unit such as shown in FIG. 6, is fitted to this conventional autotensioner.

The damper unit shown in FIG. 6 is a specific device based on the damper unit disclosed in the above publication KOKAI No. 06-47757. Since the autotensioner shown in FIGS. 3 to 5 and the damper unit shown in FIG. 6 are substantially the same in basic construction to the autotensioner and damper unit used in the tests during the stages to completion of the present invention, these will be briefly described in detail.

As shown in FIGS. 3 to 5, a fixed or stationary member 14 is fixed to a fixed portion, for example on the front face of the cylinder block, by means of a bolt (not shown) inserted into an attachment hole 15 in a central portion of the fixed member 14. A first shaft or fixed shaft 17 is inserted into an aperture 16 formed in an end portion (upper end portion in FIGS. 3 to 5) on the fixed member 14. A base end of the fixed shaft 17 is internally fixed to the aperture 16.

A swinging member 18 is pivotally supported by the fixed member 14. Specifically, a base end (lower end portion in FIGS. 3 to 5) of the swinging member 18 is supported so as to turn freely about the fixed shaft 17 by externally fitting a cylindrical portion 19 formed on the base end of the swinging member 18, around the fixed shaft 15 by way of a plain bearing 20. Furthermore, a bolt 21 passing through the fixed shaft 17 is screwed into a threaded hole formed in a fixed portion, such as on the front face of the cylinder block, thereby co-operating with the bolt (not shown) inserted into the attachment aperture 15, to prevent turning of the fixed member 14.

A second shaft or short-cylindrical protrusion 22 parallel with the first shaft or fixed shaft 17, is formed on a tip end (upper end in FIGS. 3 to 5) of the swinging member 18. A pulley 5 is rotatably supported around the protrusion 22 by a rolling bearing 23. More specifically, a bolt 24 is passed through a central aperture of an inner ring 25 of the rolling bearing 23, and through a washer 26 and then tightened with a nut 27, to thus retain the peripheral portion around the central aperture of the inner ring 25. With this location of the pulley 5, the fixed shaft 17 is located radially outwards from the outer peripheral face of the pulley 5. In other words, the first axis along which the fixed shaft is located is spaced apart from the second axis along which the pulley 5 is located, by a length longer than the radius of the pulley 5.

A coil portion 29 of a torsion coil spring 28 is located around the cylindrical portion 19 of the swinging member 18. One engaging portion 30a of the torsion coil spring 28 is engaged in a engaging aperture 31a formed in the fixed member 14, while another engaging portion 30b is inserted via a sleeve 32, into an engaging aperture 31b formed in the swinging member 18. Due to the torsion coil spring 28, a resilient force is applied to the swinging member 18 so as to turn it in a clockwise direction in FIG. 3, about the fixed shaft 17.

A damper unit 34 has a base end which is supported on a fixed arm or projection 33 provided on a part of the fixed member 14 at a location away from the fixed shaft 17.

Furthermore, the swinging member has a swinging arm 35 which is provided on a part of the swinging member 18 at a location away from the protrusion 22, so that a bearing or receiving block 37 is internally fixed in a cavity 36 formed in the swinging arm 35.

The damper unit 34 as shown in FIG. 6, has a cylinder 39 within which a viscous liquid 12 is contained, a plunger 38 which has a tip end abutted against an end face of the bearing block 37 and a piston 40 which is fitted inside the cylinder 39 so as to be freely movable in the axial direction (up/down direction in FIG. 6). A biasing spring or compression coil spring 41 is provided between the piston 40 and an internal end face of the cylinder 39 (lower end face in FIG. 6) so as to press the piston 40 in a direction out of the cylinder 39.

The plunger 38 has a base end face thereof (lower end face in FIG. 6) abutted against the piston 40. Accordingly, when the piston 40 is displaced (pushed upwards) due to the resilient force of the biasing spring 41, the amount of protrusion of the plunger 38 from the cylinder 39 increases.

An oil passage 42 is formed in a central portion of the piston 40, thus providing communication between both axial end faces of the piston 40. A lower end opening of the oil passage 42 is opened or closed by a bell 43 which is pressed against the opening under the resilient force of a compression spring 44, thus making up a ball valve type check valve 45. The check valve 45 closes when the piston 40 is displaced (lowered) against the resilient force of the biasing spring 41, and opens when the piston 40 is raised due to the resilient force of the biasing spring 41.

As shown in FIGS. 3 to 5, a stopper pin 46 is provided to immobilize swinging of the swinging member 18 about the fixed shaft 17 irrespective of the resilient force of the torsion coil spring 28, to thus facilitate the fitting of the timing belt 2 around the pulley 5. In this respect, the swinging member 18 is swung or pivoted against the resilient force of the torsion coil spring 28, to align a small hole 47 formed in the swinging member 18 and a small hole 48 formed in the fixed member 14, and the stopper pin 46 is then inserted through both holes 47, 48.

In this condition, the timing belt 2 can be easily fitted around the pulley 5, since the pulley 5 which is supported on the swinging member 18, is not displaced by the resilient force of the torsion coil spring 28. After fitting the timing belt 2, the stopper pin 46 is removed, so that the pulley 5 presses against the timing belt 2 under the resilient force of the torsion coil spring 28.

During operation of the autotensioner constructed as described above, the swinging member 18 is swung or pivoted by the resilient force of the coil spring 28, so that the pulley 5, rotatably mounted on the tip end portion of the swinging member 18, is resiliently pressed against the timing belt 2, thus restricting the movement of the swinging member 18, so that there is no further displacement of the swinging arm 35 located on the swinging member 18. As a result when the piston 40 of the damper unit 34 is displaced due to the resilient force of the biasing spring 41, so that the amount of protrusion of the plunger 38 from the cylinder 39 increases, the tip end of the plunger 38 is pressed against the bearing block 37 supported on the tip end portion of the swinging arm 35.

If the timing belt 2 slackens from this condition, the swinging member 18 is swung or pivoted in a clockwise direction in FIG. 3 about the fixed shaft 17 under the resilient force of the coil spring 28, so that the pulley 5 follows the movement of the timing belt 2. At this time, the displacement of the plunger 38 is slightly delayed, so that the tip end of the plunger 38 separates from the bearing block 37.

Therefore, when the timing belt 2 slackens, the swinging member 18 which is swung or pivoted in order that the pulley 5 follows the movement of the timing belt 2, receives absolutely no resistance from the damper unit 34. The pulley 5 can thus quickly follow the movement of the timing belt 2, thereby avoiding a drop in tension in the timing belt 2.

The plunger 38 moves out of the cylinder 39 under the resilient force of the biasing spring 41, slightly slower than the movement of the swinging member 18, until the tip end thereof bumps against the bearing block 37. When the plunger 38 is forced from the cylinder 39 in this way under the resilient force of the biasing spring 41, the check valve 45 inside the damper unit 34 opens, so that the piston 40 and plunger 38 are displaced comparatively quickly. There is thus only a very short time delay before the tip end of the plunger 38 bumps against the bearing block 37.

On the other hand, when the tension force in the timing belt 2 increases the swinging member 18 tends to rotate in a counterclockwise direction in FIG. 3 about the fixed shaft 17 against the resilient force of the torsion coil spring 28, so that the bearing block 37 is pressed against the tip end of the plunger 38. Therefore, the plunger 38 and the piston 40 must be pressed into the cylinder 39 against the resilient force of the biasing spring 41 and against the damper resistance in order to rotate the swinging member 18.

At this time, the ball 43 of the check valve 45 housed in the damper unit 34 presses against the opening of the oil passage 42 for communication between both sides of the piston 40, thus closing off the oil passage 42. The viscous liquid 12 on the lower side of the piston can therefore only flow through the leak gap between the outer peripheral face of the piston 40 and the inner peripheral face of the cylinder 39. Cutouts 49 are (FIG. 6) formed in the upper end rim of the piston 40. After flowing through the leak gap, the viscous liquid 12 then flows into the region above the piston 40 through the cut-outs 49 with lowering of the piston 40. The displacement of the piston 40 and the plunger 38 can therefore only proceed slowly. As a result, the displacement of the pulley 5 supported on the swinging member 18 can also only proceed slowly under the operation of the damper unit 34, so that the timing belt 2 is controlled by the pulley 5, and growth of oscillators in the timing belt 2 is suppressed.

In the case of the conventional construction shown in FIGS. 3 to 6, the resilient force for pressing the pulley 5 against the timing belt 2 is obtained by the torsion coil spring 28 which is used for that purpose only. Therefore since the biasing spring 41 housed in the damper unit 34 only has the role of extending the damper unit 34, a large resilient force is not required, so that the damper unit 34 can be small. Moreover, since the same type of damper unit 34 can be used for a variety of types of autotensioner having different tension settings, manufacturing costs can be reduced due to simplification of component manufacture and component management.

The construction wherein the spring for applying tension is made independent of the spring for extending the damper unit as mentioned above is well known, and disclosed in other publications such as; Japanese Patent First Publication KOKAI Nos. S58-121344, S61-294249, S61-294250, S62-271910, S62-274142, S62-274143, S62-274144, and H2-89839. Moreover, Japanese Utility Model Publication KOKAI No.H1-100953 discloses an invention wherein as well as the tensioning spring being made independent of the spring for extending the damper unit, the oscillation damping effect is increased by having an oil chamber and reserve chamber in the damper unit which are communicated by a high resistance flow passage.

Through research carried out by the present inventor, it was found that simply having the tensioning spring independent of the spring for extending the damper unit was not sufficient to fully prevent oscillations of the timing belt 2. More specifically, during engine operation, the timing belt 2 is oscillated due to the vibrations transmitted from the engine, and also due to for example fluctuations (size and speed) in the drive force transmitted from the crankshaft, so that the timing belt 2 experiences small changes in tension. That is to say, during engine operation, the tension in the timing belt 2 changes sinusoidally with a frequency proportional to the engine rotational speed.

For a high performance autotensioner, merely applying an appropriate tension to the timing belt 2 by means of a tensioning spring such as the coil spring 28 is not sufficient. The oscillations due to fluctuations in tension must also be adequately suppressed.

On the other hand, with the conventional construction shown for example in FIGS. 3 to 6, when the damper unit 34 is simply made smaller (compared to the first example of the conventional construction shown in FIGS. 1 to 2), the performance of the damper unit 34 becomes inadequate. More specifically, when the tension in the portion of the timing belt 2 controlled by the pulley 5 increases rapidly, then since the overall length of the damper unit 34 is relatively easily contracted, the pulley 5 is relatively easily displaced (in a direction retreating away from the timing belt 2). Hence oscillations in the timing belt 2 cannot be sufficiently suppressed, so that the timing belt 2 tends to flutter.

Also with the invention disclosed in the beforementioned Japanese Utility Model First Publication KOKAI No. H1-100953, although constructed to address the problem related to a sudden drop in tension of the timing belt 2, there is no consideration of the situation as described above for adequate control of the timing belt 2 when the tension increases rapidly.

SUMMARY OF THE PRESENT INVENTION

The present invention was developed in view of the above situation with the object of providing an autotensioner wherein the damper unit has sufficient damping capacity even in the case of a small size damper unit, and which can control tension fluctuations in the timing belt down to a minimum.

An object of the present invention is to provide an autotensioner having a damper unit the leak gap of which is controlled in dimension with reference to the other members in the autotensioner.

Another object of the present invention is to provide an autotensioner wherein, sufficient damper performance can be maintained, and oscillations of the timing belt effectively prevented with the life of the timing belt sufficiently maintained.

Another object of the present invention is to provide an autotensioner wherein small size construction is possible, enabling the unit to be installed in the limited space of the engine cylinder block, so that the degree of freedom in engine design is improved.

DESCRIPTION OF THE PREFERRED EMBODIMENTS

Figure 1:
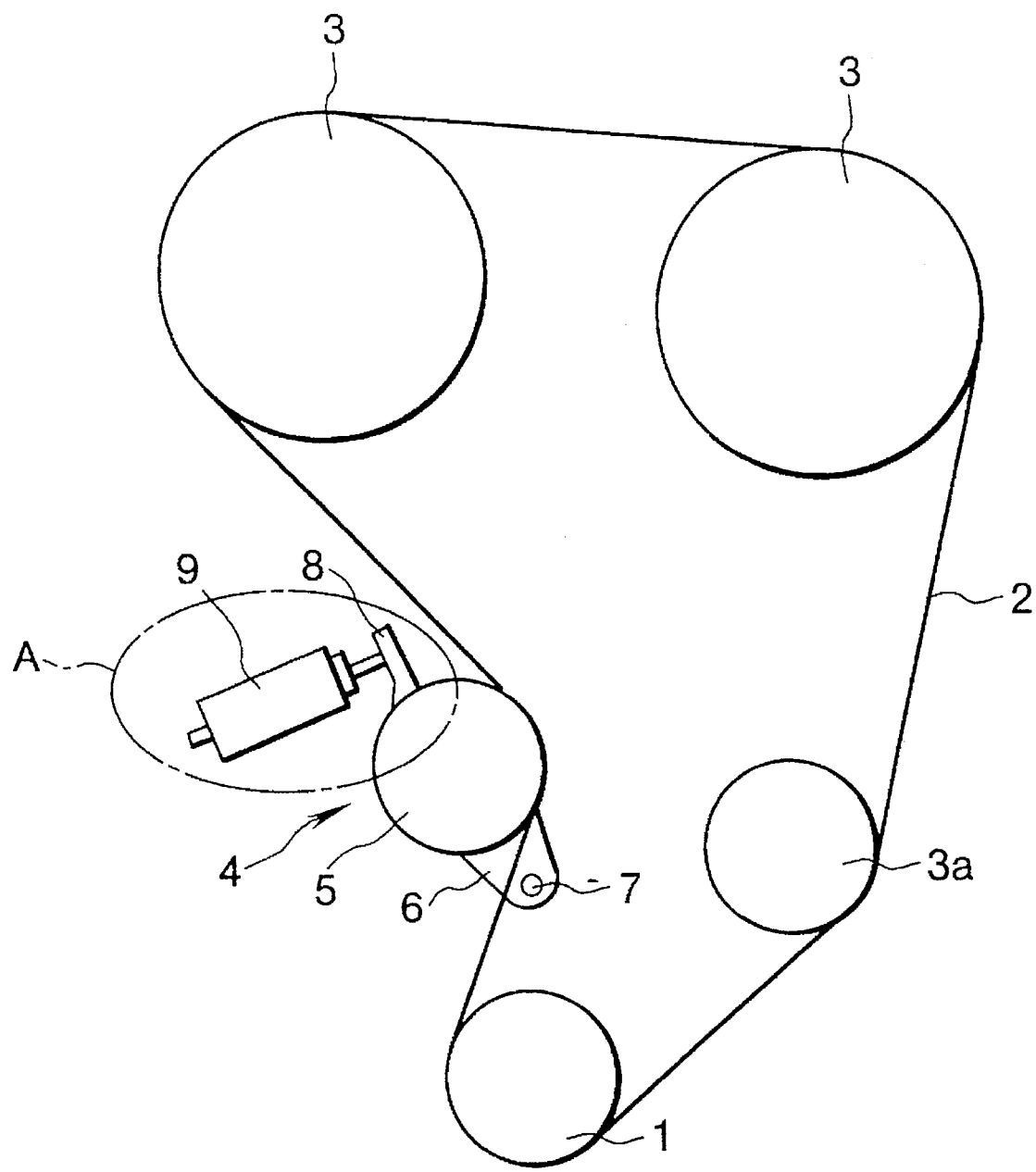
FIG. 1 is a front view of an engine timing belt drive unit fitted with an autotensioner of a first conventional example.
Figure 2:
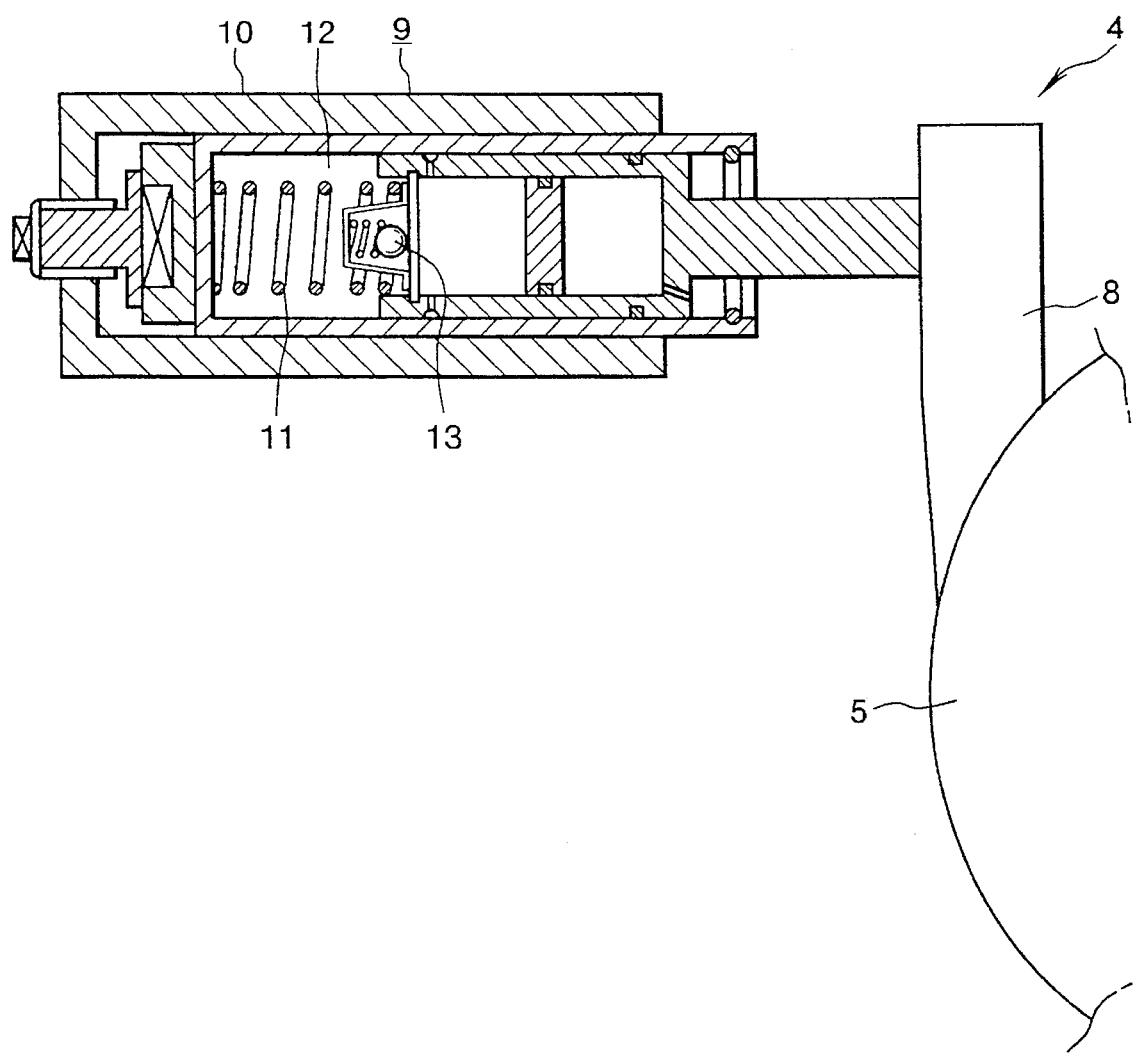
FIG. 2 is a part cut away enlarged view of the part indicated by II in FIG. 1.

The autotensioner according to the present invention comprises; a first shaft supported on a fixed portion directly or by way of a fixed member fixed to the fixed portion, a swinging member freely swinging about the first shaft, a second shaft parallel to the first shaft provided on one part of the swinging member separated from the first shaft, a pulley supported so as to be freely rotatable about the second shaft, a tensioning spring provided between the fixed portion or the fixed member and the swinging member, for applying a resilient force to the swinging member to press the pulley towards a timing belt, and a damper unit provided between the fixed portion or fixed member and the swinging member, for providing a resistance to displacement of the swinging member, against the resilient force of the tensioning spring.

The damper unit comprises; a cylinder in which viscous liquid is sealed, a piston fitted inside the cylinder so as to be movable in an axial direction thereof, a biasing spring provided between the piston and the cylinder for biasing the piston in one direction, a plunger which protrudes increasingly from the cylinder with displacement of the piston under a resilient force of the biasing spring, an oil passage communicating between both axial end faces of the piston, and a check valve provided in series with the oil passage and adapted to open only when the piston is displaced under the resilient force of the biasing spring. Furthermore, the tensioning spring is provided outside of the cylinder.

In the discussion below with the autotensioner of the present invention, the dimensions are designated as follows;

r represents an inner diameter (mm) of the cylinder.

d represents an outer diameter (mm) of the piston.

h represents a leak gap (mm) between the cylinder and the piston.

The width (h) of the leak gap is half the difference between the inner diameter (r) of the cylinder and the outer diameter (d) of the piston, that is $h=(r-d)/2$, and specified to be between ($h_1$) and ($h_2$) respectively obtained by the following equation, and equal to or greater than 0.002 mm (2 microns):

$$(m_1+B_1m_2) \, d^2x/dt^2+B_2\{(3\pi\nu\rho L'd^3)/4h^3\}dx/dt+(B_3K_1+B_4K_2)x=a \sin(2\pi ft)$$

where in the equation;

$m_1$ represents a total swinging inertial mass (kg) of the swinging member and members which swing together with the swinging member, $m_2$ represents a total inertial mass (kg) of the members which move axially inside the cylinder with extension and contraction of the damper unit, ν represents the kinematic viscosity (mm²/s) of the viscous liquid under operating conditions of the autotensioner, ρ represents the density (kg/mm³) of the viscous liquid under the operating conditions of the autotensioner, L represents an axial length (mm) of the small leak gap existing between the inner peripheral face of the cylinder and the outer peripheral face of the piston, $K_1$ represents the spring constant (kg/s²) of the tensioning spring, $K_2$ represents the spring constant (kg/s²) of the biasing spring, $B_1$, $B_2$, $B_4$ represent movement direction coefficients for displacement between the pulley and the damper unit, related to the swinging member, $B_3$ represents a movement direction coefficient for displacement between the pulley and the tensioning spring, related to the swinging member, a represents a half amplitude (kg·mm/s²) of the fluctuations in the input load to the pulley, accompanying tension fluctuations in the timing belt under operating conditions, f represents a frequency (Hz of the oscillations of the timing belt which is most detrimental under operating conditions, t represents time (s), x represents displacement (mm) of the pulley accompanying oscillations of the timing belt, dx/dt represents displacement velocity (mm/s) of the pulley accompanying tension fluctuations in the timing belt, $d^2x/dt^2$ represents displacement acceleration (mm/s²) of the pulley accompanying tension fluctuations in the timing belt, and y represents amplitude (mm) of the timing belt, being the pulley displacement accompanying the tension fluctuations in the timing belt. In other words, the (y) is the difference between a position for maximum swing in one direction and a position for maximum swung in the other direction, of the portion of the timing belt controlled by the pulley. Therefore, this difference is symbolized as (Xp–p), but the (y) is used for simplification in the present specification.

The temperature of the autotensioner during engine operation, and also with the seasons can rise to in the range of about 80 to about 120 degrees Celsius. Accordingly for values such as the kinetic viscosity (v) and density ($\rho$) of the viscous liquid, where the influence of temperature change cannot be disregarded, values for the operating condition temperatures (for example 100 degrees Celsius) are used. In practice, dimensional changes accompanying thermal expansion can be disregarded. If this is not possible, the relevant dimensions are made those for the respective operating conditions.

The most detrimental frequency of oscillation of the timing belt under operating conditions, differs to some degree depending on for example the number of cylinders and displacement of the engine, and whether or not the engine is a gasoline engine or a diesel engine. In the case of a standard four cylinder engine, 50 Hz is used for both gasoline and diesel engines. This is because at a rotational speed of 1500 rpm the oscillation of the timing belt is a maximum and its secondary oscillations are most detrimental ($1500/60 \times 2 = 50(Hz)$). When the engine rotational speed is lower than this, the vibration energy is reduced, while when higher, the engine rotation becomes smooth so that vibration is minimal.

It will be noted that the leak gap width ($h_1$) is for the half amplitude (y/2) of 0.7 mm, while the leak gap width ($h_2$) is for the half amplitude (y/2) of 0.05 mm.

With the autotensioner of the present invention constructed as described above, the resilient force for pressing the pulley against the timing belt comes from a tensioning spring provided outside of the damper unit. Consequently, the resilient force of the biasing spring housed inside the damper unit need only be sufficient for extending the damper unit. The biasing spring can thus be small enabling a reduction in size of the damper unit so that the autotensioner can be installed in a limited space.

When the timing belt is loose, the pulley immediately follows the timing belt under the resilient force of the tensioning spring, thereby avoiding a drop in tension of the timing belt. Accordingly, the so-called "tooth jump" with creep of the teeth on the inner peripheral face of the timing belt relative to the teeth on the outer peripheral face of the drive, follower and guide pulleys can be positively prevented.

Moreover, by controlling the width (h) of the cylindrical shaped leak gap between the inner peripheral face of the cylinder and the outer peripheral face of the piston of the damper unit, then the pulley displacement width (y) accompanying the oscillation of the timing belt can be controlled within a range from 0.01 to 1.4 mm. By keeping the displacement width (y) up to 1.4 mm, the vibrations of the timing belt controlled by the pulley can be kept small. As a result, the generation of abnormal vibrations in parts driven by the timing belt, and the occurrence of tooth jump, can be effectively prevented.

According to experiments carried out by the present inventor, in the case of a timing belt fitted to a standard vehicle engine (1000 to 300 cc class), it was found that if the displacement width (y) was kept up to 1.4 mm, then undesirable conditions (the occurrence of vibration, drive noise and tooth jump etc.) due to oscillation of the timing belt could be reliably prevented. By keeping the width (h) of the leak gap up to (h1), that is $H \leq h1$), then the displacement width (y) could be controlled up to 1.4 mm.

Moreover, since the displacement width (y) is kept equal to or above 0.1 mm, then when the tension in the timing belt rises rapidly so that the pulley is pressed hard, the energy to cause the rapid rise in tension of the timing belt can be absorbed by a certain amount. As a result, the life of the timing belt can be sufficiently maintained.

Otherwise, if the pulley does not move in the retreating direction in the case of a rise in the tension of the timing belt, then an excessive stress is applied to a part of the teeth on the inner peripheral face of the timing belt, at the portion which is engaged with the teeth on the outer peripheral face of the drive pulley and follower pulley. As a result the teeth on the inner peripheral face of the timing belt becomes susceptible to damage.

It should be noted that, with the present invention, since the displacement width (y) can be maintained equal to or above 0.1 mm by having the width (h) of the leak gap above ($h_2$), that is ($h \geq h_2$), the life of the timing belt can be maintained.

Moreover, since the width (h) of the leak gap is kept equal to or above 0.002 mm (2 microns), then the operation of inserting the piston into the cylinder in assembling the damper unit, can be adequately carried out at the factory level. On the other hand, even if the relation of ($h_2 \leq h \leq h_1$) is satisfied, if the (h) is less then 0.002 mm, that is (h<0.002 mm), the damper unit assembly operation becomes difficult. That is to say, with the damper unit fitted to the autotensioner according to the present invention, it is necessary to control the width (h) of the leak gap to a desirable value.

There are also cases wherein due to machining accuracy, it is difficult to realize the desirable value, and in this case it has been considered to selectively fit a cylinder with a previously measured inner diameter (r) and a piston with a previously measured outer diameter (d), to realize the desired leak gap width (h), (so that is h=(r–d)/2). However, even if this selective fitting method is adopted, if the relation ($h \geq 0.002$ mm) is not maintained, it is difficult to assemble the piston into cylinder. Therefore the width (h) of the leak gap must be kept equal to or above 0.002 mm in the present invention.

Now, the embodiments of the present invention are explained referring to the drawings. First, the course towards completion of the present invention will be described.

Figure 3:
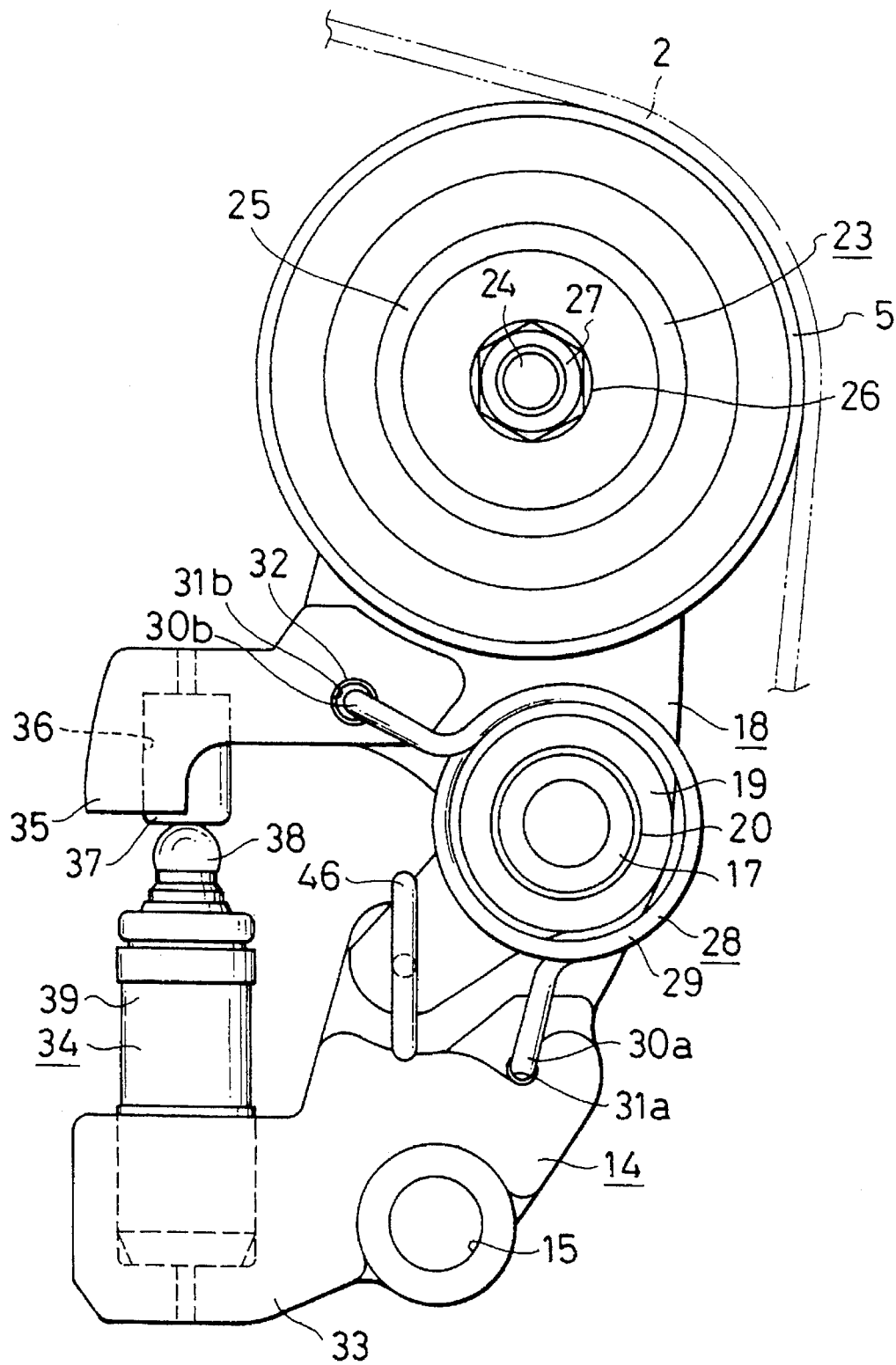
FIG. 3 is a front view of an autotensioner of a second conventional example.
Figure 4:
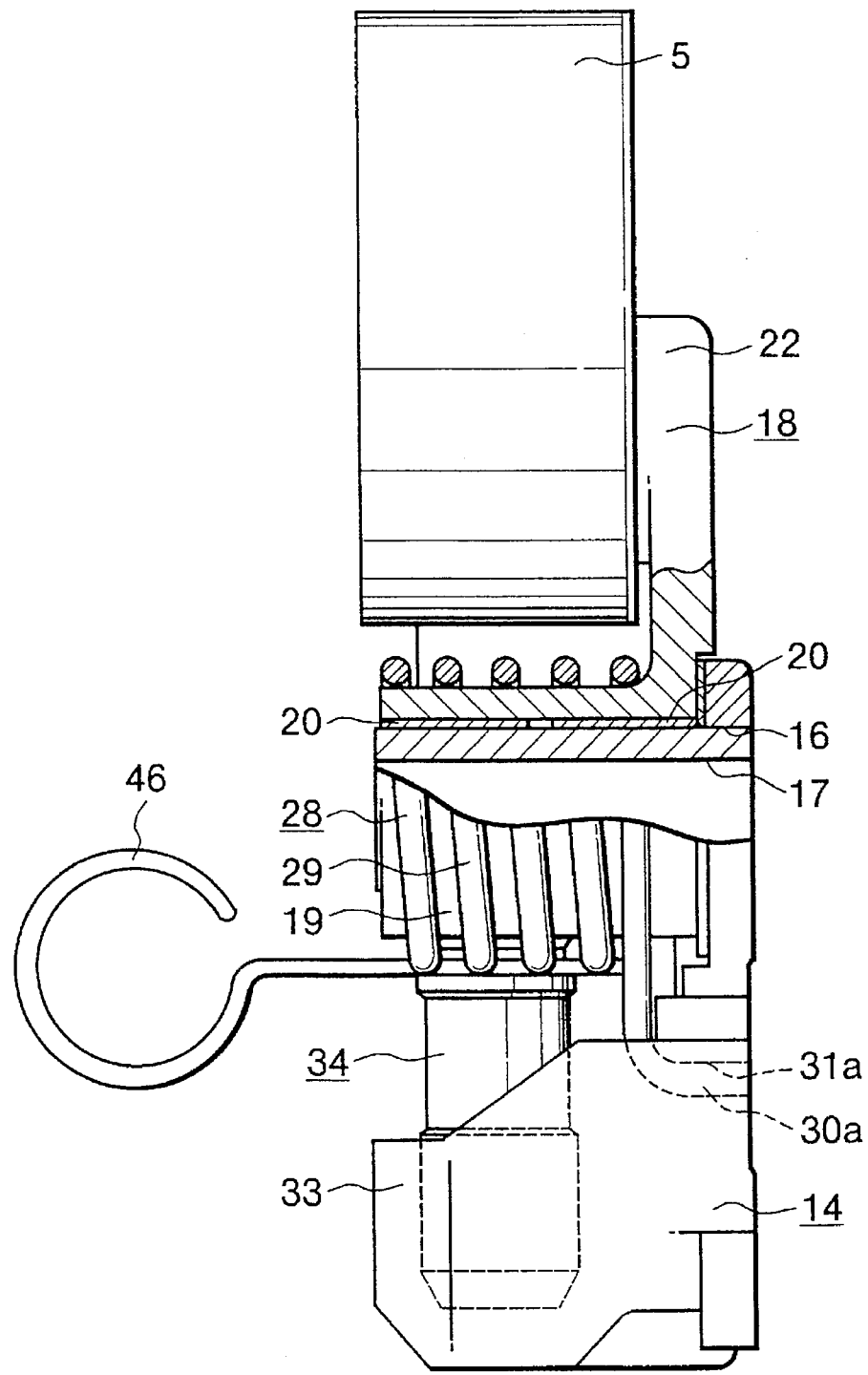
FIG. 4 is a partially cut away side view of FIG. 3.
Figure 5:
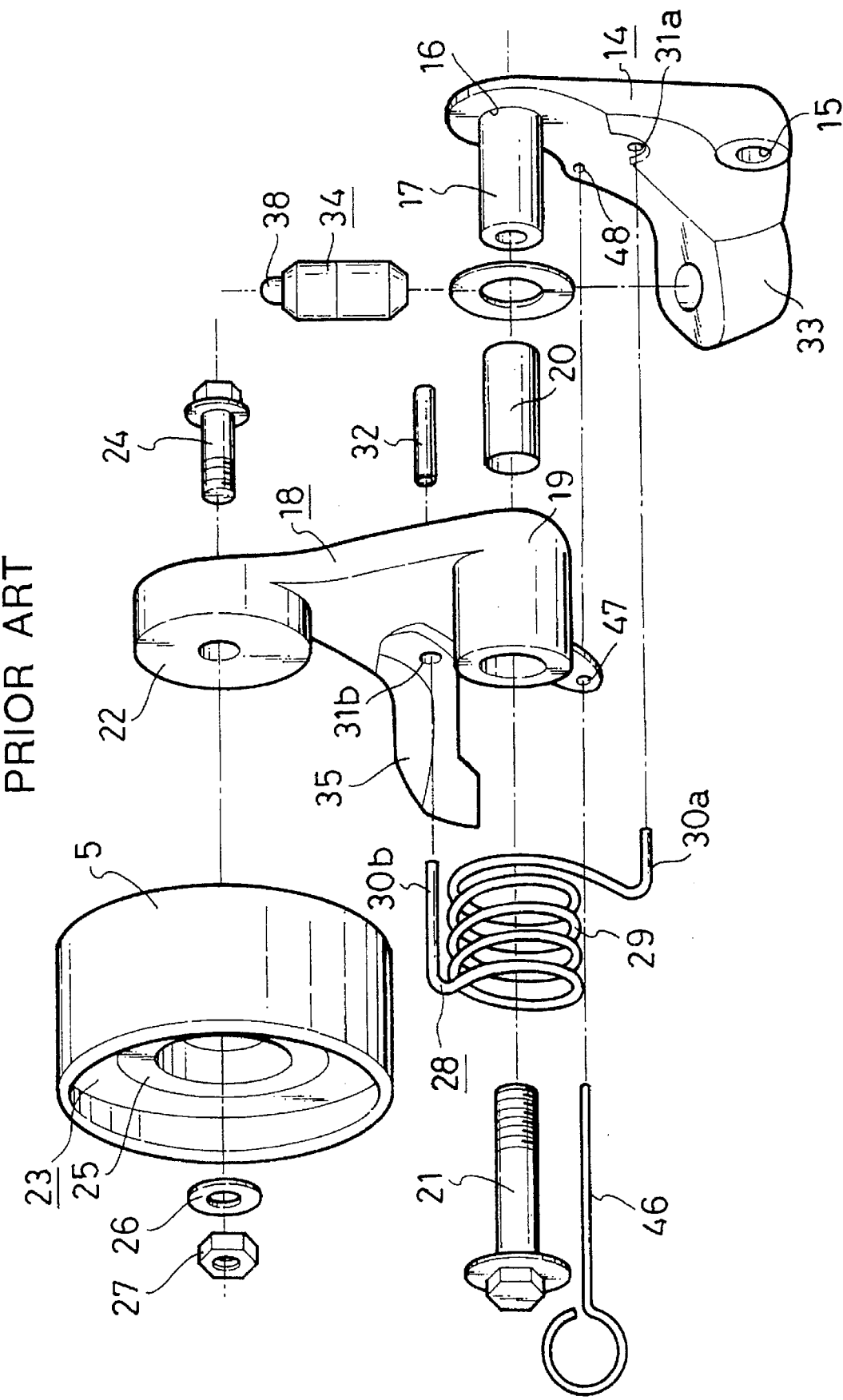
FIG. 5 is an exploded view of FIG. 3.
Figure 6:
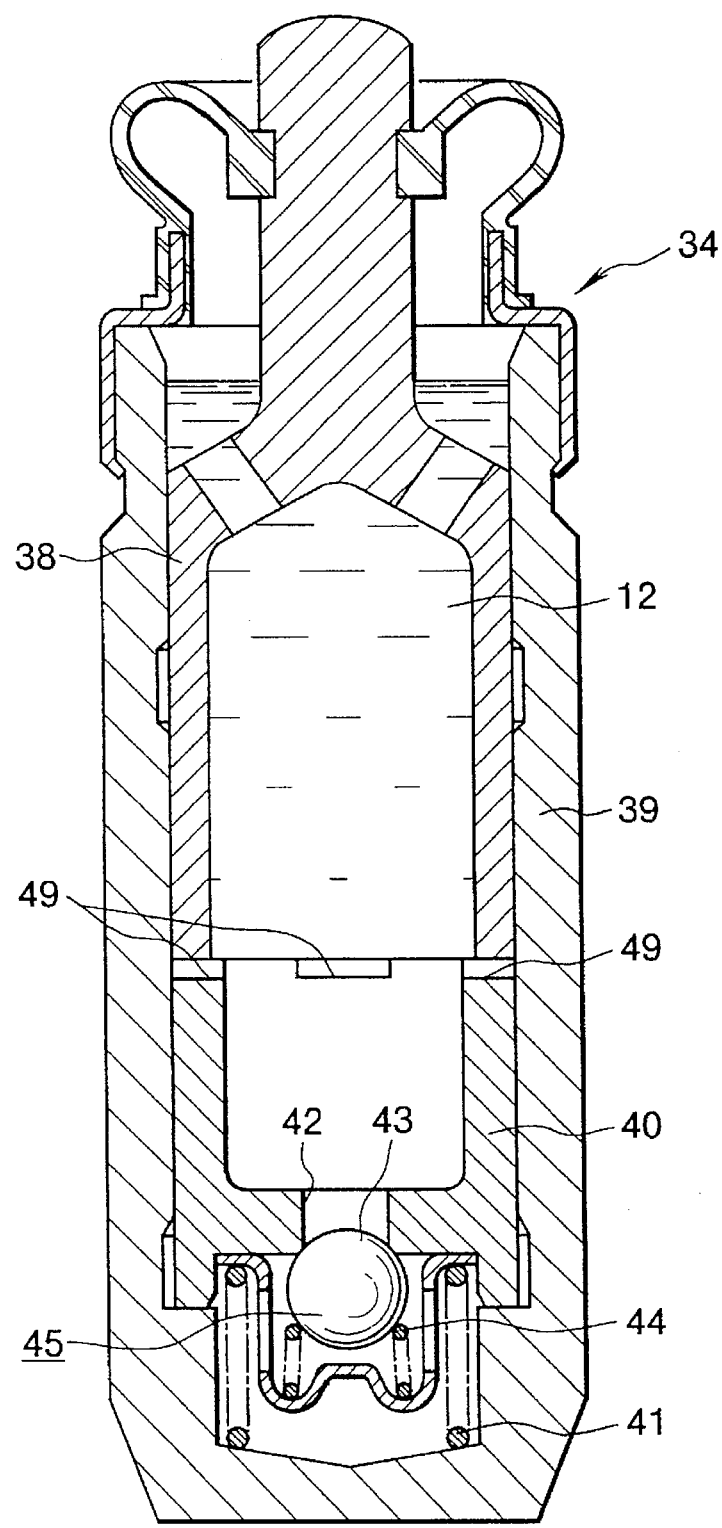
FIG. 6 is a cross sectional view of a damper unit incorporated in the second example configuration.
Figure 7:
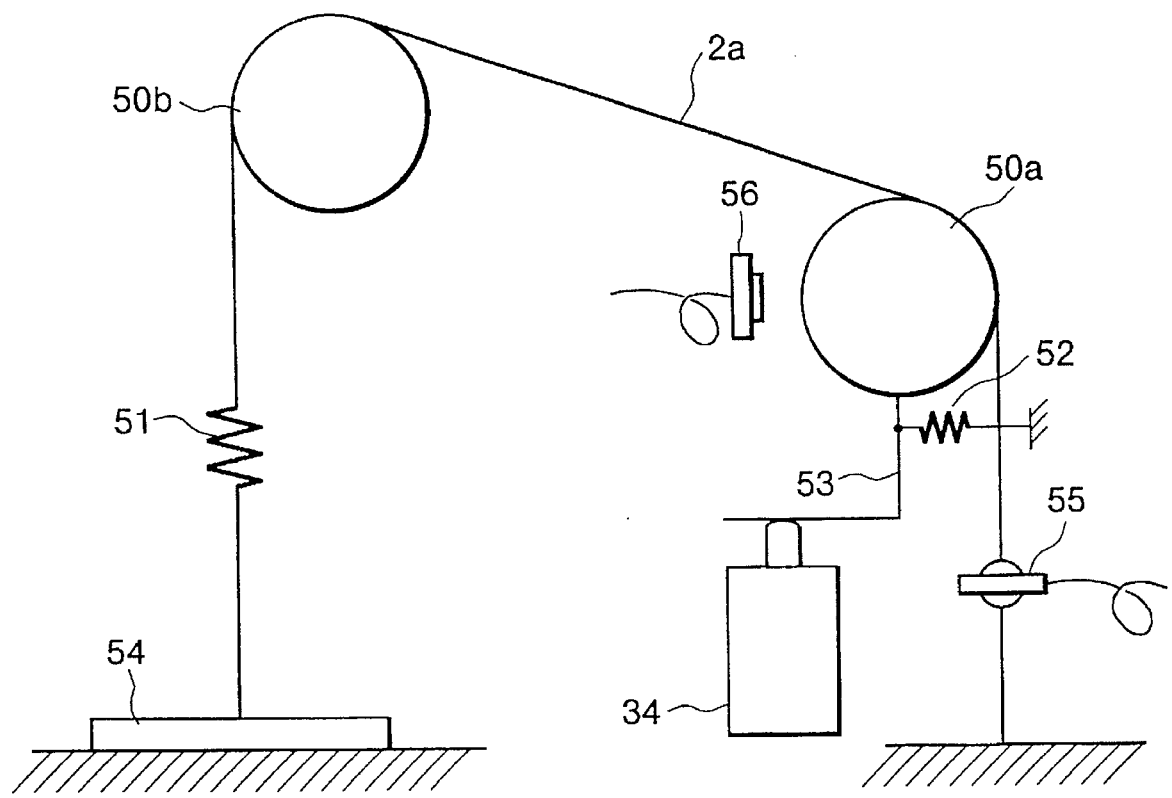
FIG. 7 is a schematic elevation view of a test apparatus for testing oscillation prevention performance of an autotensioner.

In order to understand the vibration damping capacity of the damper unit 34 shown in FIG. 6 which is assembled into an autotensioner such as shown in FIGS. 3 to 5, the present inventor used a test rig such as shown in outline in FIG. 7 to measure the vibration damping capacity of a large number of damper units.

With this test rig, a timing belt 2a fitted around pulleys 50a, 50b was tensioned by a spring 51. A predetermined resilient force was applied to the pulley 50a by means of a spring 52 acting through a swinging member 53, to apply a predetermined tension to the belt 2a. The tension of the belt 2a was varied sinusoidally by means of an exciter 54, and the fluctuations in tension were measured by a load cell 55, and simultaneously the displacements of the pulley 50a were measured by a non-contact type displacement sensor 56.

By means of such a test rig, the present inventor was able to investigate the influence of miniaturization of the damper unit 34 on the displacement characteristics of the pulley 50a of the autotensioner, and on flutter of the timing belt 2a.

In the results, for the case of a damper unit 34 with a small leak gap between the inner peripheral face of the cylinder 39

(FIG. 6) and the outer peripheral face of the piston 40 (FIG. 6), a good damper performance was verified. For example, with a damper unit 34 having a width (h) of the leak gap from about 2.5 to about 3.5 microns (expressed as half of the difference between the inner diameter (r) of the cylinder 39 and the outer diameter (d) of the piston 40, that is h=(r−d)/2), then extremely good damper performance was realized.

Here, in order to determine whether or not the improvement in damper performance was due to a reduction in the leak gap, the present inventor carried out experiments using the test rig shown in FIG. 7 fitted with damper units 34 which were machined to increase only the width (h) of the leak gap, and found that damper performance deteriorated.

It was thus verified that a reduction in the width (h) of the leak gap was effective in improving the damper performance. However from the experiments of the present inventor, it was apparent that the appropriate width (h) of the leak gap differed depending on the size of the damper unit 34, so that merely controlling the width (h) of the leak gap to an absolute value, did not ensure a satisfactorily damper performance.

In this respect, the present inventor variously changed the width (h) of the leak gap and the outer diameter (d) of the piston, and carried out experiments using the test apparatus of FIG. 7 to measure displacements of the pulley 5. It was found that the width (h) of the leak gap, in particular the upper limit value for the width (h), to obtain a sufficient damper performance differed depending on the outer diameter (d).

The test conditions for measuring the displacement, apart from those for the outer diameter (d) and the leak gap width (h), are as follows:

Tension oscillation (vibration) in Timing belt 2a: Sign wave between±30 kgf

Frequency of tension oscillation in timing belt 2a : 50 Hz

Kinematic Viscosity in Viscous liquid 12 (FIG. 6) : 32 oSt

The kinematic viscosity of the viscous liquid 12 was made to conform to the kinematic viscosity of oil generally used as the viscous liquid in autotensioner damper units, at 100 degrees Celsius which is a general autotensioner operating conditions temperature.

The First Measurement Tests

The influence that the width (h) of the leak gap exerted on the performance of the damper unit 34 was measured as follows:

the diameter (d) of the piston 40 : 11.4 mm, the axial length (L) of the small leak gap between the inner peripheral face of the cylinder 39 and the outer peripheral face of the piston 40 : 10 mm.

Incidentally, the axial length (L) is approximately equal to the length of the piston 40.

The width (h) expressed by (r−d)/2, being half the difference between the inner diameter (r) of the cylinder 39 and the outer diameter (d) of the piston was changed to examine the influence of the width (h) to the performance of the damper unit 34.

Figure 8:
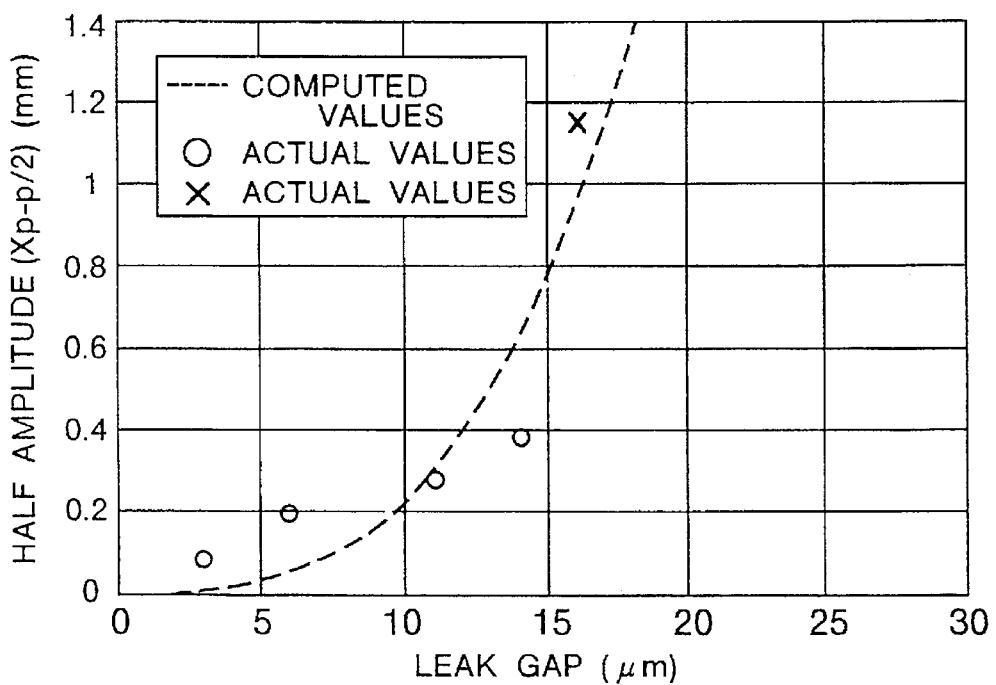
FIG. 8 is a graph showing a first example of a relation between a half amplitude of oscillation of a timing belt and a leak gap.

The performance of the damper unit 34 was measured by the displacement width (y) of the pulley 5 accompanying the tension fluctuations in the timing belt 2. The half amplitude (y/2) being half of the displacement width (y), is shown together with the leak gap width (h) in the following Table 1 and in FIG. 8. In FIG. 8, ($X_{p-p}$) is used in lieu of (y).

TABLE 1

| Leak gap (microns) | 3 | 6 | 11 | 14 | 16 |
|---|---|---|---|---|---|
| Half amplitude (mm) | 0.09 | 0.20 | 0.28 | 0.39 | 1.15 |

In the course of the experiments, it was found that when the half amplitude (y/2) exceeded 0.7 mm, or when the displacement width (y) exceeded 1.4 mm, the oscillations of the timing belt 2 became undesirably large. Under this premise, referring to the information in Table 1 and FIG. 8, in the damper unit 34 with an outer diameter (d) of the piston 40 of 11.4 mm, the performance is satisfactory for a width (h) of the leak gap up to 14 microns. However, with a mere increase in width (h) from 14 microns to 16 microns a sudden drop in performance is observed.

In FIG. 8 (and similarly in FIGS. 9 and 10 to be described later) the symbols O and X indicate the experimental values for the half amplitude (y/2). The symbol O represents the range wherein sufficient oscillation prevention effect can be obtained (half amplitude of 0.7 mm or less), that is to say, in the example of the present invention, while the symbol X represents the range wherein oscillation prevention effect is inadequate (half amplitude exceeds 0.7 mm), that is to say in a comparative example outside of the technical range of the present invention.

The Second Experimental Measurements

Figure 9:
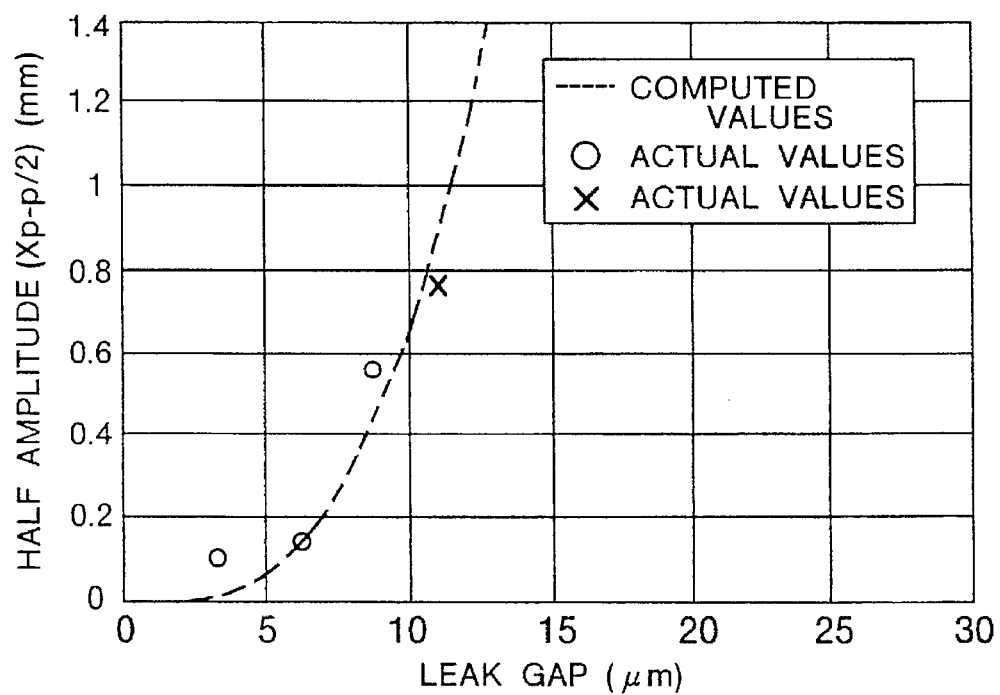
FIG. 9 is a graph showing a second example of the above relation.

The half amplitude (y/2) of the pulley 5 was measured with the outer diameter (d) of the piston 40 at 8.0 mm, and the other conditions the same as for the first measurement experiment. The results are shown together with the width (h) of the leak gap in the following Table 2 and in FIG. 9. In FIG. 9, ($X_{p-p}$) is used in lieu of (y).

TABLE 2

| Leak gap (microns) | 3 | 6 | 9 | 11 |
|---|---|---|---|---|
| Half amplitude (mm) | 0.11 | 0.14 | 0.55 | 0.76 |

As is clear from Table 2 and FIG. 9, in the damper unit 34 with an outer diameter (d) of the piston 40 of 8.0 mm, the performance is satisfactory for a width (h) of the leak gap up to 9 microns. However, in the course of increasing the width (h) from 9 microns to 11 microns, a drop in performance to an ineffective level is observed.

The Third Experimental Measurements

Figure 10:
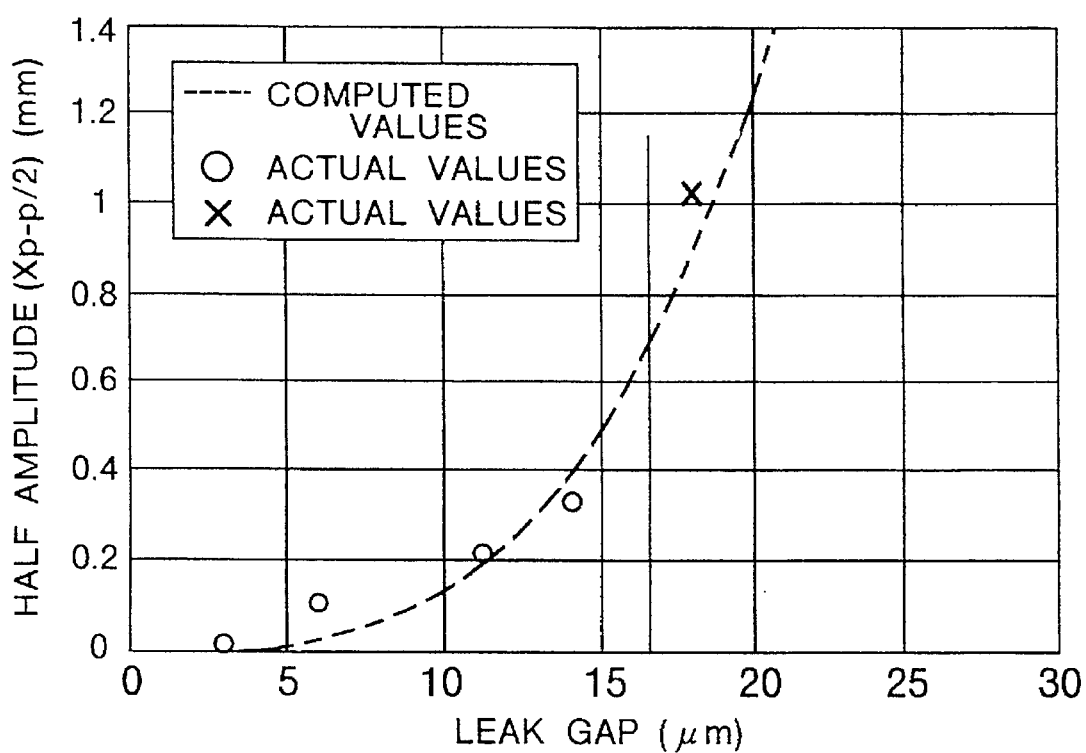
FIG. 10 is a graph showing a third example of the above relation.

The half amplitude (y/2) of the pulley 5 was measured with the diameter (d) of the piston 40 at 13.0 mm, and the other conditions the same as for the first and second measurement experiments. The results are shown together with the width (h) of the leak gap in the following Table 3 and in FIG. 10. In FIG. 10, ($X_{p-p}$) is used in lieu of (y).

TABLE 3

| Leak gap (microns) | 3 | 6 | 11 | 14 | 18 |
|---|---|---|---|---|---|
| Half amplitude (mm) | 0.02 | 0.13 | 0.22 | 0.36 | 1.03 |

From Table 3 and FIG. 10, it is apparent that in the damper unit 34 with an outer diameter (d) of the piston 40 of 13.0 mm, the performance is satisfactory for a width (h) of the leak gap up to 14 microns. However, in the course of increasing the width (h) from 14 microns to 18 microns, a sudden drop in performance is observed.

As is clear from these series of measurement the width (h) of the leak gap in particular the upper limit value for the width (h) differs depending on the outer diameter (d) of the piston 40 to obtain a sufficient damper performance. Accordingly, it is necessary to realize a technique to obtain sufficient performance also for different sizes of the damper unit 34. In consideration of this situation, the present inventor completed the present invention by the following course of experiments.

Experiments for Completing the Present Invention

At first, the range of 0.1 to 1.4 mm was set as allowable for the displacement width (y) of the timing belt 2. That is to say, the half amplitude (y/2) was made 0.05 to 0.7 mm (0.05 mm≦(y/2) ≦0.7 mm). Here, the upper limit value (y/2=0.7 mm) was based on the fact that at the time of the abovementioned various measurement tests, when the half amplitude (y/2) exceeded 0.7 mm, the oscillations of the timing belt 2 became undesirably large.

The lower limit was controlled to avoid unreasonable stress on the teeth on the inner peripheral face of the timing belt 2. More specifically, when the tension of the timing belt 2 rises rapidly so that the pulley 5 is pressed hard, if the pulley 5 cannot not move at all, then the energy acting in the direction of the rapid rise in tension of the timing belt 2 (the direction of tension), cannot be absorbed. As a result, the life of the timing belt 2 cannot be sufficiently maintained. That is to say, in the case of a rapid rise in tension of the timing belt 2, if the pulley 5 does not move fully in the retreating direction, then an excess stress is applied to a part of the teeth on the inner peripheral face of the timing belt 2, which is engaged with the teeth on the outer peripheral face of the drive pulley 1 and follower pulleys 3, 3a (FIG. 1).

As a result the teeth on the inner peripheral face of the timing belt 2 become susceptible to damage. In order to overcome this undesirable situation, it is necessary to keep the half amplitude (y/2) to 0.05 mm or more so that the energy is absorbed by a certain amount. With the half amplitude (y/2) kept at this amount, there is no possibility of tooth jump.

Therefore, to meet the above requirements, 0.5 mm≦(y/2) ≦0.7 mm becomes the required conditions for a damper unit for an autotensioner of good performance.

Figure 11:
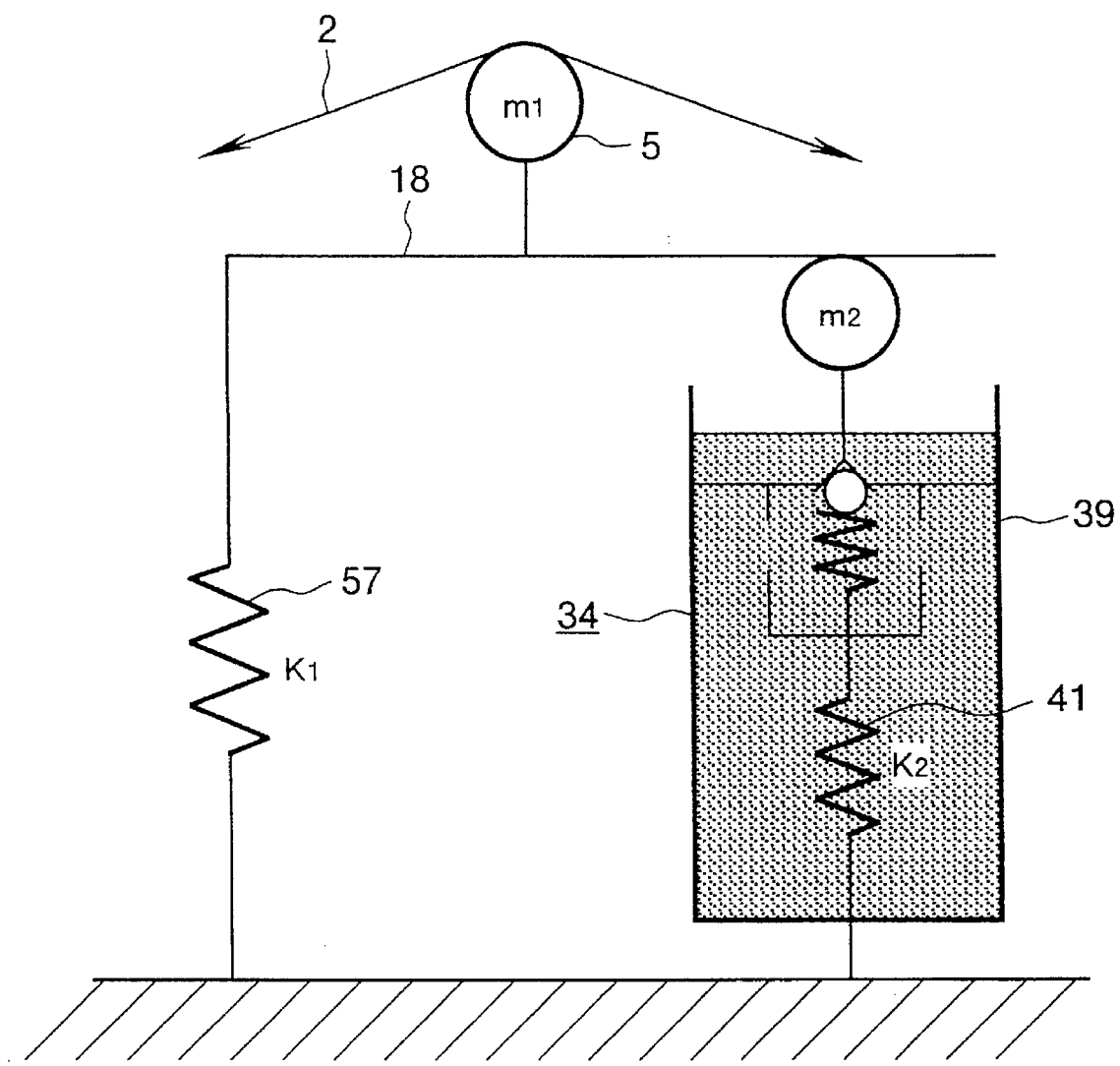
FIG. 11 is a diagram illustrating an oscillation model for a timing belt and an autotensioner.

To obtain the width (h) of the leak gap for these conditions, a vibration model as shown in FIG. 11 was considered. FIG. 11 is a schematic diagram of the relevant parts of the timing belt 2 and the autotensioner.

In FIG. 11:

$m_1$ represents the total swinging inertial mass (kg) of the swinging member 18 and the members which swing together with the swinging member 18, $m_2$ represents the total inertial mass (kg) of the members which move axially inside the cylinder 39 with extension and contraction of the damper unit 34, $K_1$ represents the spring constant (kg/s$^2$) of a tensioning spring 57 (the torsion coil spring 28 in FIGS. 3 to 5) for pressing the pulley 5 against the timing belt 2, and K2 represents the spring constant (kg/s$^2$) of the biasing spring 41 for extending the damper unit 34.

By applying the basic vibration equation shown below to the vibration system shown in FIG. 11, a technique is achieved for obtaining sufficient performance also for cases wherein the size of the damper unit 34 differs.

The basic vibration equation which forms the basis of the present invention is represented by:

$$M(d^2x/dt^2)+C(dx/dt)+Kx=a \sin(2\pi ft)$$

wherein;

m represents the inertial mass (kg), c represents the viscous damping coefficient (kg/s), K represents the spring constant (kg/s$^2$), a represents the half amplitude of the input load (kg·mm/s$^2$), f represents the frequency of the input load (Hz), t represents time (s), π represents displacement (mm), dx/dt represents displacement velocity (mm/s), and $d^2x/dt^2$ represents displacement acceleration (mm/s$^2$).

By substituting as follows, the relevant structural element values of the actual autotensioner, for the respective items in the basic vibration equation, an effective equation applicable to the actual autotensioner can be obtained.

At first, with regards to the inertial mass (m) in the first item in the equation, in the case of the autotensioner, this is in the form of the following two masses (1), (2):

(1) The total inertial mass ($m_1$) of the swinging member 18 and the members which swing together with the swinging member 18.

This mass ($m_1$) includes as well as the inertial mass of the swinging member 18 itself, the inertial mass of the pulley 5 which is pivotally supported on the tip end portion of the swinging member 18, and the inertial mass of for example the rolling bearing for supporting the pulley 5. That is to say, the mass ($m_1$) is the total inertial mass of the swinging member 18 and the members which are swingingly displaced with the swinging member 18.

This swinging inertial mass ($m_1$) is directed in the swinging direction of the pulley 5.

Accordingly, the masses ($m_s$) of the members which are uniformly disposed around the rotation center of the pulley 5, such as the pulley 5 per se and the rolling bearing etc. are added without change.

On the other hand, the inertial mass ($m_{18}$) of the swinging member 18 is obtained by the following equation, and added to the masses ($m_s$) of for example the pulley 5 and the rolling bearing etc., to give the swinging inertial mass $m_1$ ($m_1=m_s+m_{18}$).

$$m_{18}=M \cdot L_g/L_p$$

In this equation;

M represents the mass of the swinging member 18, $L_G$ represents the distance from the swinging axis of the swinging member 18 to the center of gravity of the swinging member 18, $L_p$ is the distance between the second axis or rotation axis of the pulley 5 and the first axis or swinging axis of the swinging member 18, or in other words the distance between the center of the fixed shaft or first shaft 17, and the center on the bolt 24 which acts as the second shaft: (see FIG. 12).

(2) The total inertial mass ($m_2$) of the members which move axially inside the cylinder 39 with extension and contraction of the damper unit 34.

That is to say, this mass ($m_2$) is the total inertial mass of the various members such as the piston 40, the plunger 38, and the check valve 45, which move axially inside the cylinder 39.

The sum of the inertial masses ($m_1$, $m_2$) becomes the first item mass (m) on the left hand side of the equation. It should be noted here that the inertial mass ($m_1$) of the swinging member 18 and the members which swing together with the swinging member 18 is used as it is, while the total inertial mass ($m_2$) of the members which move axially inside the cylinder 39 must be modified by applying a coefficient which takes into consideration the proportion at which the movement of the damper unit 34 is transmitted to the swinging member 18.

Figure 12:
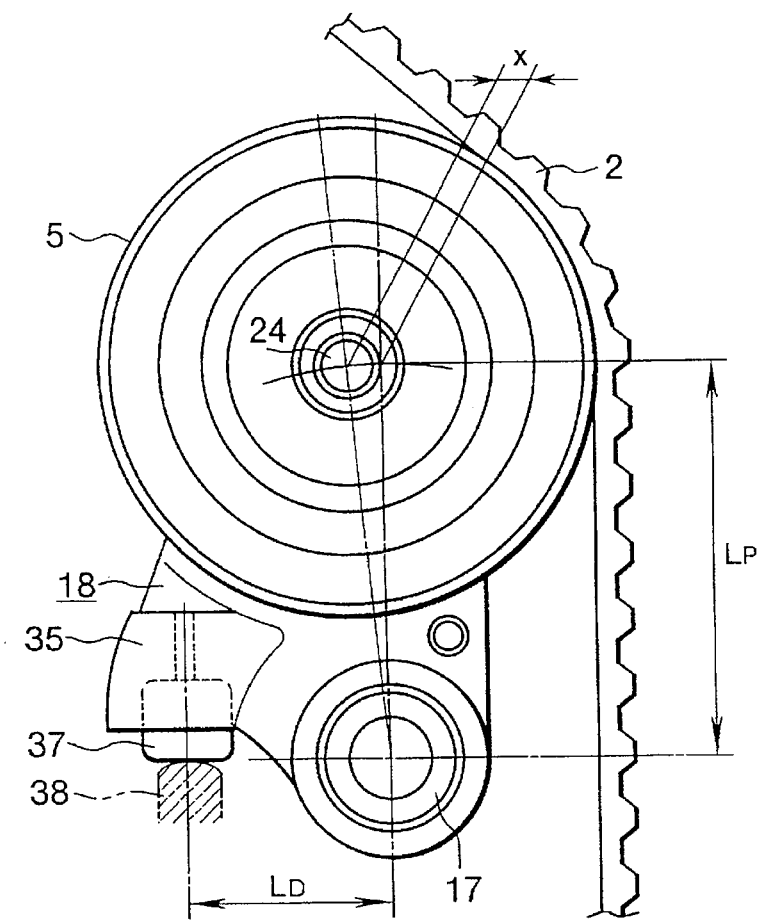
FIG. 12 is a partially cut away front view of an autotensioner, for explaining movement direction coefficients for displacement related to a damper unit and a swinging member.
Figure 12:
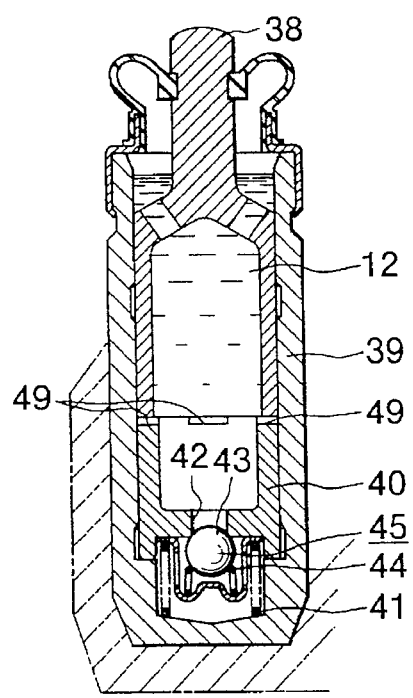

In this respect, as shown in FIG. 12:

$L_p$ represents the distance between the second axis or rotation axis of the pulley 5 and the first axis or swinging axis of the swinging member 18 or in other words, the distance between the center of the fixed shaft 17 and center of the bolt 24, and $L_D$ represent the distance between the swinging axis of the swinging member 18 and the point where the plunger 38 of the damper unit 34 presses against the swinging member 18.

Then, as is clear from the theory of levers, the inertial mass $m_2$ will exert an influence proportional to ($L_n/L_p$) on the swinging of the swinging member 18. Therefore a coefficient ($B_1=L_D/L_p$) is multiplied to the total inertial mass ($m_2$) of the members which move axially inside the cylinder 39, and this is then added to the swinging inertial mass ($m_1$).

As will be apparent from the above, the mass (m) in the first item on the left hand side of the basic vibration equation can be replaced by ($m_1+B_1 \cdot m_2$), that is, ($m=m_1+B_1 \cdot m_2$) for application to an actual autotensioner.

Next the viscous damping coefficient (C) in the second item on the left hand side of the basic vibration equation will be described.

The viscous damping coefficient (C) is a measure of the resistance to compression of the overall length of the damper unit 34. That is to say, it shows the throttle resistance of the leak gap 58 (see FIG. 13) to be described next, and is obtained from the following equation;

$$C = (3\pi v \rho L d^3)/4h^3$$

Figure 13:
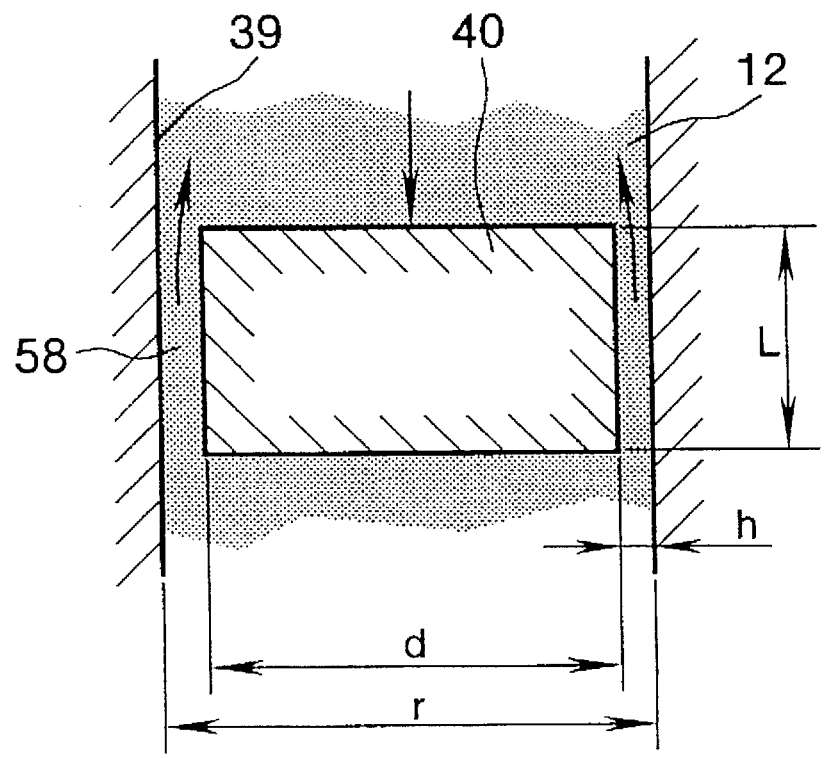
FIG. 13 is a schematic cross sectional view illustrating fitting portions of a cylinder and piston, for explaining a viscous damping coefficient.

The dimension symbols in this equation are shown in FIG. 13, which schematically shows the inside of the damper unit 34.

A prerequisite for obtaining the viscous damping coefficient C in the above basic vibration equation is that as shown in FIG. 13, the cylinder 39 and the piston 40 are placed concentric so that a cylindrical shape leak gap 58 between the inner peripheral face of the cylinder 39 and the outer peripheral face of the piston 40 has a width (b) which does not change around the whole circumference. Accordingly, the width (h) can be expressed as half of the difference between the inner diameter (r) of the cylinder 39 and the outer diameter (d) of the piston 40, that is (r-d)/2. If the cylinder 39 and the piston 40 are not concentric, the width (h) can be multiplied by a predetermined coefficient corresponding to the amount of eccentricity, to reduce the value for the viscous damping coefficient C. However if well designed so that the piston 40 is pressed without axial inclination, then a drop in the value of the viscous damping coefficient C due to eccentricity, can in practice be disregarded.

The symbols in the above equation, apart from the width (h) of the leak gap 58, are as follows:

v : kinematic viscosity of the viscous liquid 12 ($mm^2/s$),

ρ : density of the viscous liquid 12 ($kg/mm^3$)

L : axial length of the leak gap 58 (mm)

d : outer diameter of the piston 40 (mm)

In substituting the viscous damping coefficient (C) obtained as described above, into the basic vibration equation, it is necessary to apply a coefficient which takes into consideration the proportion at which the movement of the damper unit 34 is transmitted to the swinging member 18. In this respect, as shown in FIG. 12, supposing the distance ($L_p$) between the second axis or rotation axis of the pulley 5 and the first axis or swinging axis of the swinging member 18 (the distance between the center of the fixed shaft or first shaft 17, and the center of the bolt or second shaft 24), and the distance ($L_D$) between the swinging axis of the swinging member 18 and the point where the plunger 38 of the damper unit 34 presses against the swinging member 18, then as is clear from the theory of levers, the resistance from the damper unit 34 will exert an influence proportional to $L_D/L_p$ on the swinging of the swinging member 18. Therefore a coefficient $B_2(=B_1)=L_D/L_p$ must be applied to the equation for the viscous damping coefficient (C). Therefore, when considering an actual autotensioner the viscous damping coefficient (C) in the basic vibration equation can be replaced by;

$$C = B_2\{(3\pi v \rho L d^3)/4h^3\}$$

Next the spring constant (K) in the third item on the left hand side of the basic vibration equation will be described. For pressing the pulley 5 against the timing belt 2, there are two springs, namely the tensioning spring 57 (FIG. 11) such as a torsion coil spring 28 (see FIGS. 3 to 5), and the biasing spring 41 (FIG. 11) for extending the damper unit 34. Supposing that the tensioning spring 57 has a spring constant $K_1$ ($kg/s^2$), and that the biasing spring 41 has a spring constant $K_2$ ($kg/s^2$), the sum of these spring constants ($K_1$, $K_2$) corresponds to the third item K on the left hand side of the basic vibration equation. The sum of the resilient force of these springs 57 (28), 41 however does not simply give the resilient force pressing the pulley 5 against the timing belt 2.

Figure 14:
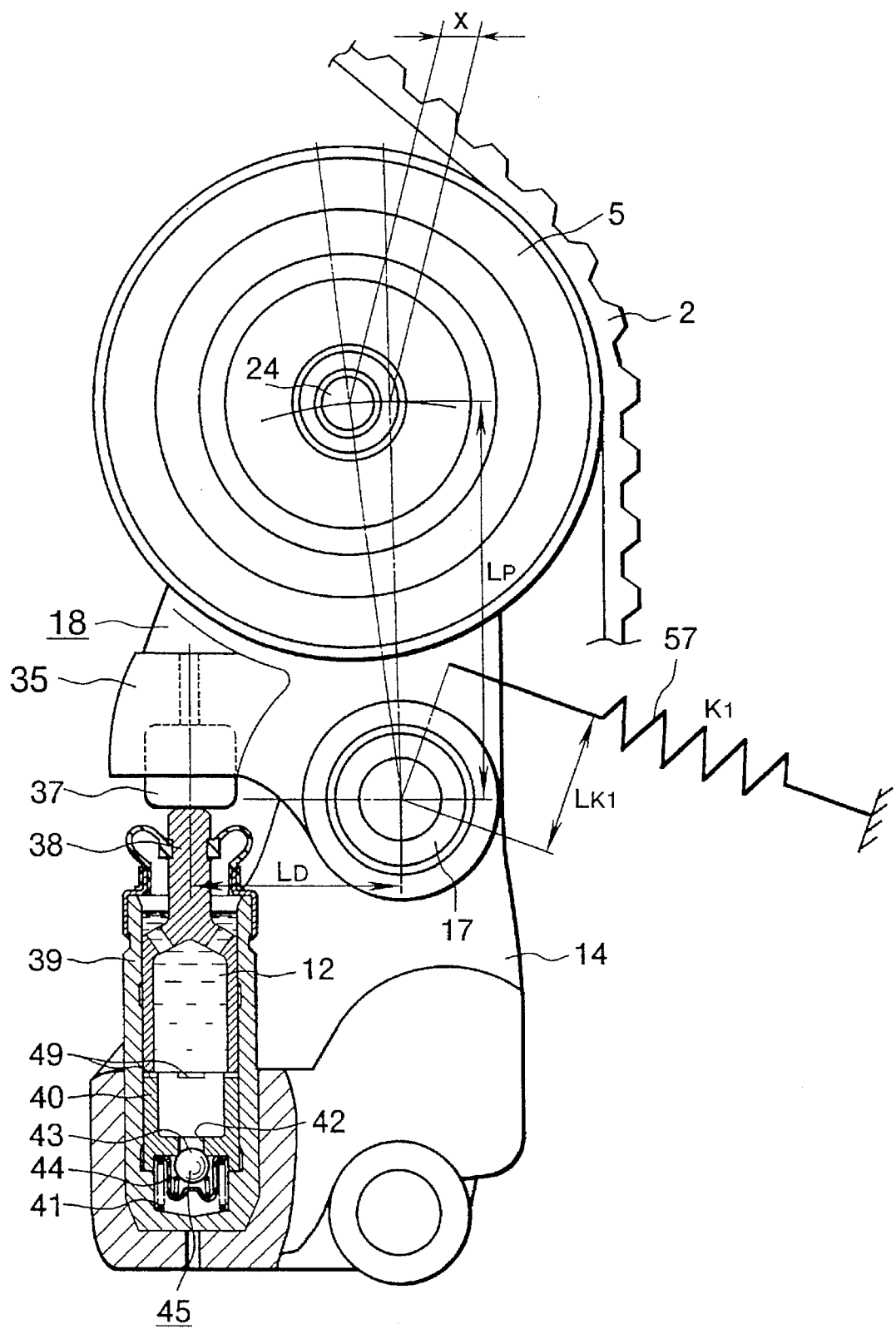
FIG. 14 is a partially cut away front view of an autotensioner, for explaining a movement direction coefficient for displacement related to a tensioning spring and a swinging member.

That is to say, coefficients determined from the theory of levers, corresponding to the distance between the swinging axis or first shaft of the swinging member 18 and the operating point for the respective springs 57 (28), 41, and the rotation axis or second shaft of the pulley 5, must first be applied to the constants ($K_1$, $K_2$) before adding. For example, as shown in FIG. 14, the following designations are made;

$L_{K1}$ represents the distance from the swinging axis to the operating point of the tensioning spring 57, $L_D$ represents the distance between the swinging axis and the operating point of the biasing spring 41 (the contact point between the plunger 38 of the damper unit 34 and the swinging member 18), and $L_p$ represents the distance between the second axis or rotation axis of the pulley 5 and the first axis or swinging axis of the swinging member 18 (the distance between the center of the fixed shaft or first shaft 17, and the center of the bolt or second shaft 24).

Then the spring constant ($K_1$) of the tensioning spring 57 is multiplied by a coefficient ($B_3$) being ($L_{K1}/L_p$), and the spring constant ($K_2$) of the biasing spring 41 is multiplied by a coefficient $B_4$ ($=B_1=B_2$) being ($L_D/L_p$) and the results then added.

Therefore, when considering an actual autotensioner, the spring constant (K) in the abovementioned basic vibration equation can be replaced by;

$$K = B_3 K_1 + B_4 K_2$$

The size of the spring constants ($K_1$, $K_2$) of the respective springs 57, 41 is determined relative to the tangential direction of an arc centered on the swinging axis of the swinging member 18 (the fixed shaft or first shaft 17). When the direction of action of the resilient force of the spring is inclined at an angle (θ) to the tangential direction, then the respective spring constants ($K_1$, $K_2$) are multiplied by cos θ as well as by the coefficients ($B_3$, $B_4$).

The same applies for the case of the beforementioned viscous damping coefficient (C).

The elements on the right hand side of the basic vibration equation will now be described. The right hand side represents the tension fluctuations in the timing belt 2. As mentioned before, at the time of taking measurements with the test rig of FIG. 7, the tension applied to the timing belt 2a is varied sinusoidally by means of the exciter 54. The tension fluctuations of the timing belt 2a during the experiment can thus be expressed according to the right hand side of the equation as; a sine (2 πft).

In this tension fluctuation equation;

a represents the half amplitude (kg·mm/s$^2$) of the fluctuations in input load to the pulley 5 accompanying the tension fluctuations in the timing belt 2a under operating conditions, t represents time (s), and f represents the frequency (Hz) of the oscillations of the timing belt 2a.

From the above, the beforementioned basic vibration equation can be changed to one applicable to analysis of the autotensioner. That is to say, substituting for $$m = (m_1 + B_1 m_2)$$

$$C = B_2 \{(3\pi\nu\rho L d^3)/4h^3\} \text{ and}$$

$$K = B_3 K_1 + B_4 K_2$$

in the basic vibration equation represented by;

$$m(d^2x/dt^2) + C(dx/dt) + Kx = a \sin(2\pi ft) \text{ gives:}$$

$$(m_1+B_1m_2)d^2x/dt^2 + B_2\{(3\pi\nu\rho L\, d^3)/4\, h^3)\}dx/dt + (B_3K_1+B_4K_2)x = a \sin(2\pi ft) \quad \text{Equ. (1)}$$

thus giving a second order differential basic vibration equation which can be used for analysis of the autotensioner, that is to say for obtaining the displacement (x) of the pulley 5.

The present inventor considered using the above equation (1) to obtain an autotensioner of small size and also having a good performance, and therefore made an investigation to determine the appropriateness of controlling the dimensions of a damper unit for an autotensioner according to equation (1). This investigation was carried out based on the measured values given in the beforementioned Tables 1 to 3 and FIGS. 8 to 10. In carrying out this investigation, an autotensioner such as shown in FIG. 14 (similar to that of FIGS. 3 to 5) was prepared.

Various values, apart from the diameters (d) of the pistons and the widths (h) of the leak gaps variously changed as shown in Table 1 to 3, were obtained by actual measurement or were set by the test rig. These actual measurement values and set values are as follows.

Actual measured value:

$$m_1 + B_1 m_2 = 0.3 (kg)$$

Set values for the autotensioner used in the test:

$B_2 = 1$ $\nu = 32(cSt) = 32(mm^2/s)$ $\rho = 0.98 \times 10^{-6} (kg/mm^3)$ $L = 10$ (mm)

$B_3 K_1 + B_4 K_2 = 4900 (kg/s^2)$

Set conditions for the test apparatus:

$a = 2.94 \times 10^5$ (kg·mm/s$^2$)

$f = 50$ (Hz)

Substituting these values in equation (1), and using the Runge Kutta's method to solve the equation, gives the displacements (x) of the pulley 5 corresponding to changes in the width (h) of the leak gap.

From this displacement (x), the displacement width (y), and the half amplitude (y/2) can be obtained.

With regards to the Runge Kutta's method, this is given for example in "Mechanical Engineering Handbook", basic edition Japan Society of Mechanical Engineers A3 pages 196 to 197 or ("Introduction to NUMERICAL ANALYSIS", ADDISON - WESLEY PUBLISHING COMPANY. Second Edition Pages 268 to 271).

The computed values for the half amplitude are shown respectively in FIGS. 8 to 10 by the broken line. The broken line in FIG. 8 represents the relation between the width (h) and the half amplitude (y/2) for the case where the diameter (d) of the piston 40 was 11.4 mm, while the broken lines in FIG. 9 and FIG. 10 similarly represents the relation between the values for when d=8.0 mm, and d=13 mm, respectively.

If the broken lines shown in FIGS. 8 to 10 are compared with the actual measured values in FIGS. 8 to 10, shown as O and X then it can be seen that the actual measured values are closed to the values computed from Equation (1).

The autotensioner fitted with the damper unit 34 having dimensions corresponding to the symbols O, is an embodiment of the present invention, while the autotensioner fitted with the damper unit 34 having dimensions corresponding to the symbols X, is a comparative example outside of the technical range of the present invention, as mentioned before.

From this, it can be seen that even for cases wherein the size of the damper unit 34 differs, it is possible by using equation (1), to realize an autotensioner having sufficient performance. For example, as mentioned before, in order to prevent oscillations detrimental to the timing belt 2 and thus maintain the life of the timing belt 2, it is sufficient to keep the half amplitude (y/2) within the range of 0.05 mm to 0.7 mm. Therefore, respective upper limit and lower limit values for the width (h) of the leak gap with respect to the outer diameter (d) can be obtained by convergence computation, from the 3 sets of values (for diameters of 11.4 mm 8.0 mm, 13.0 mm) related to the outer diameter (d) and the half amplitude, giving the following Table 4.

An outline of the convergence computation is as follows;

At first, an appropriate pair of values are substituted for the width (h) in Equation (1), and the resultant half amplitude (y/2) measured. Computation is then repeatedly carried out changing the value of one of the widths (h) so as to approach a predetermined half amplitude (y/2), until a value very close to this is obtained. In Table 4, the units for the values representing the width (h) are in microns.

Table 4

|  | d = 11.4 (mm) | d = 8 (mm) | d = 13 (mm) |
| --- | --- | --- | --- |
| y / 2 = 0.05 | h = 6.0 | h = 4.2 | h = 6.8 |
| y / 2 = 0.7 | h = 14.5 | h = 10.2 | h = 16.5 |

From this table, it can be seen that when for example the outer diameter of the piston 40 is 11.4 mm, if the width (h) of the leak gap is 6.0 microns or more, then the half amplitude (y/2) of the pulley 5 can be kept 0.05 mm or more, so that the life of the timing belt 2 can be maintained, while if the width (h) of the leak gap is kept 14.5 microns or less, the half amplitude (y/2) of the pulley is controlled to 0.7 mm or less, thus avoiding detrimental flutter of the timing belt 2.

With the autotensioner of the present invention, since the width (h) of the leak gap 58 (FIG. 13) between the inner peripheral face of the cylinder 39 and the outer peripheral face of the piston 40 in the damper unit 34, is controlled to within a predetermined range according to the equation obtained as above, then a small size unit with exceptional damping performance can be used for the damper unit 34. Therefore the autotensioner of the present invention, in spite of being small and thus facilitating installation into a limited engine space, is very effective in preventing oscillation of the timing belt 2.

A feature of this autotensioner is that the width (h) of the leak gap 58 between the inner peripheral face of the cylinder 39 and the outer peripheral face of the piston 40 in the damper unit 34, is controlled as described above, within a predetermined range.

Accordingly, the present invention is not limited to the autotensioner of the construction shown in FIGS. 3 to 5 used in the experiments, but is also applicable to constructions such as disclosed in the beforementioned various publications.

Next is a description concerning constructions for which the present invention is applicable.

Figure 15:
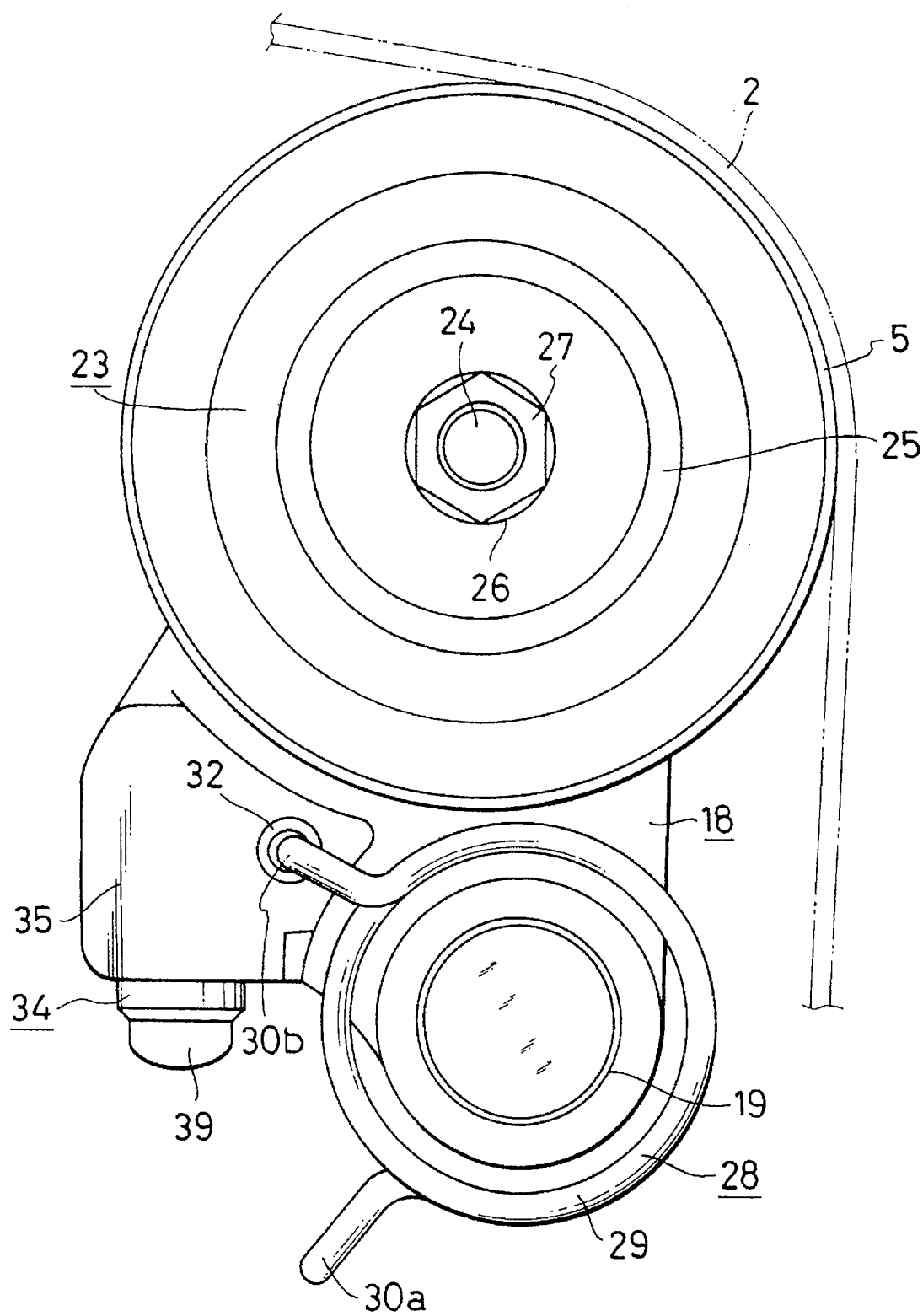
FIG. 15 is a front view of an autotensioner showing a first example of a construction capable of embodying the present invention.
Figure 16:
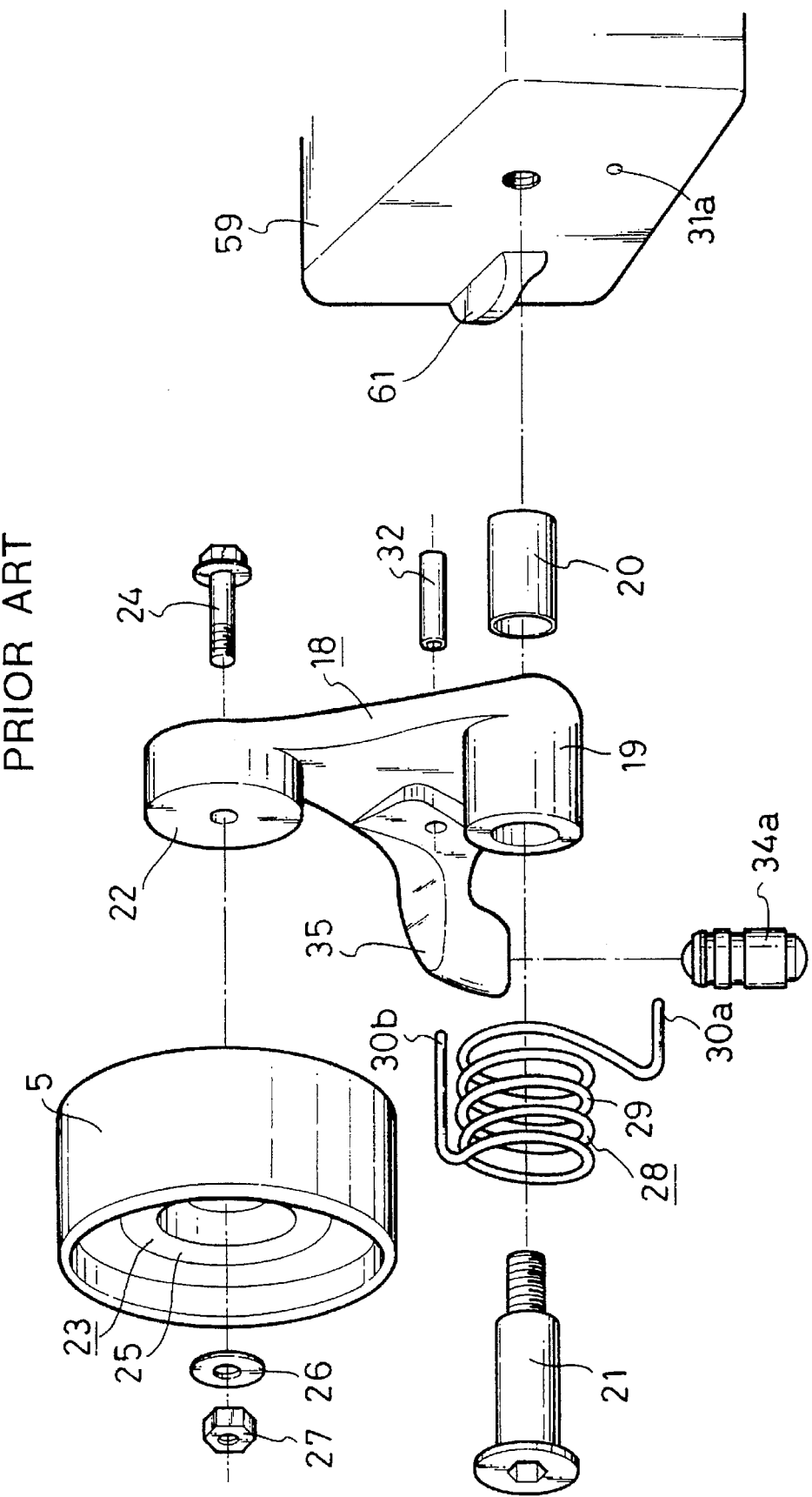
FIG. 16 is a exploded view of FIG. 15.

FIGS. 15 and 16 show a construction disclosed in Japanese Utility Model First Publication KOKAI No. H6-87758 for a first example capable of embodying the present invention. The characteristic of the construction in FIGS. 15 and 16 is that in order to simplify construction, the seating portion, shape and construction of the damper unit 34a are devised so that the fixed member 14 of the conventional construction shown in FIGS. 3 to 5 can be omitted. The construction and operation of the other parts are similar to the conventional construction shown in FIGS. 3 to 5 and hence similar parts are indicated with the same symbol and repeated description is omitted or abbreviated. As follows is a description focusing on the characteristic points of the construction of the first example.

A swinging member 18 is pivotally supported directly on a fixed portion 59, such as the front face of the cylinder block rather than through the fixed member 14 (FIGS. 3 to 5). For this, a bolt or first shaft 21 is inserted into a cylindrical portion 10 formed on the base end (bottom end in FIGS. 15 to 16) of the swinging member 18. A plain bearing 20 is provided. An engaging portion 30a of a torsion coil spring 28 is engaged in an engaging hole 31a formed in the fixed portion 59. A resilient force is applied to the swinging member 18 by the torsion coil spring 28 so as to turn in a clockwise direction in FIG. 15 about the bolt 21. In the case of engagement of the engaging portion 30a with the fixed portion 59, instead of engaging in the engaging hole 31a, engagement can be by way of an engagement lug such as an engagement groove or a pin provided on the fixed portion 59.

Formed in a swinging arm 35 provided on the swinging member 18 is a cavity 36a into which is fitted a damper unit 34a. A protruding lug 61 is provided on a part of the fixed portion 59 away from the bolt 21, such that an outer end of the damper unit 34a is faced to an end face of the lug 61.

Figure 17:
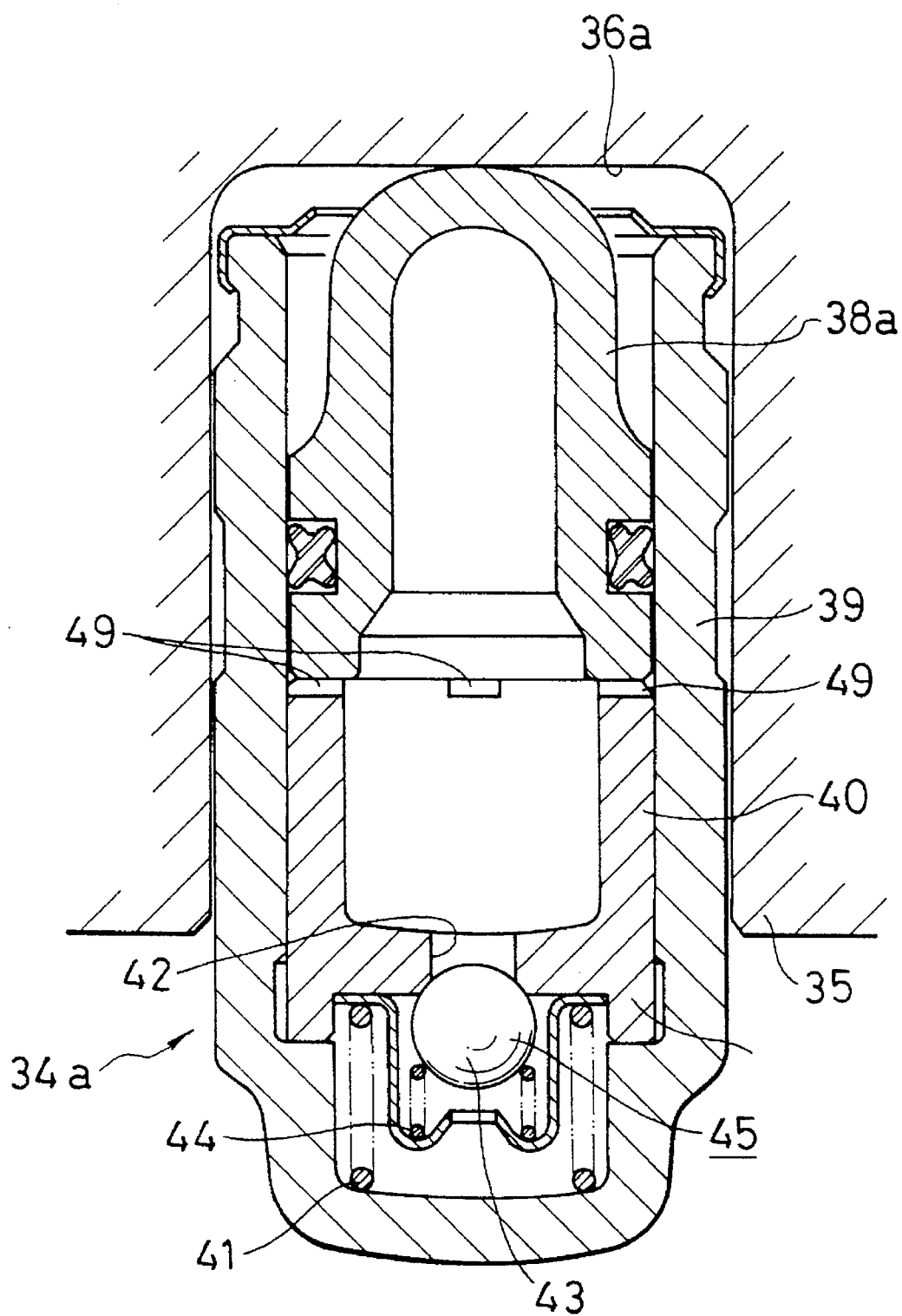
FIG. 17 is a cross sectional view showing a contracted condition of a damper unit fitted to the first example.
Figure 18:
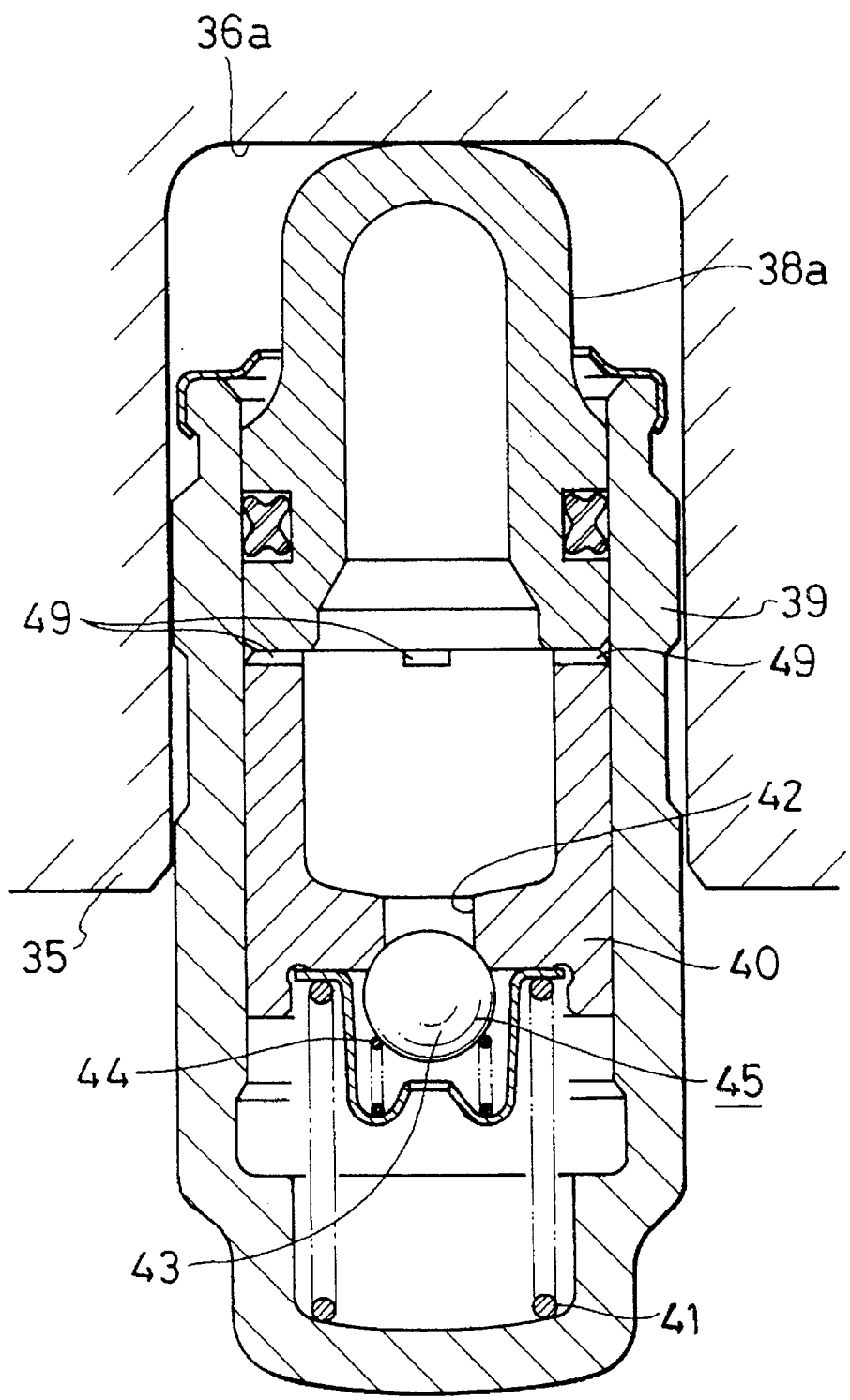
FIG. 18 is a cross sectional view showing the damper unit of FIG. 17 in an extended condition.

The basic construction of the damper unit 34a shown in FIG. 17 and 18 is similar to the construction illustrated in FIG. 6, and hence corresponding parts are indicated by the same symbol and repeated description is omitted.

With the damper unit 34a used in the present embodiment however, the diameter of the plunger 38a is bigger than that of the damper unit 34 shown in FIG. 6.

Furthermore, in order to insertingly support the cylinder 39 of the damper unit 34a in the cavity 36a, the cylinder 39 is inserted slidingly in the cavity 36a in an axial direction with the plunger 38a inserted deep into the cavity 36a. Moreover, the bottom face of the cylinder 39 is abutted against the protruding lug 61. Therefore, with the swinging or pivoting of the swinging member 18, the end portion of the cylinder 39 moves in a direction so as to protrude from the cavity 36a. With the autotensioner shown in FIGS. 15 and 16 constructed as described above, since the fixed member 14 (FIGS. 3 to 5) is omitted, the overall body of the autotensioner can be made small and light weight. As a result, the autotensioner can be fitted into a narrower location space.

Figure 19:
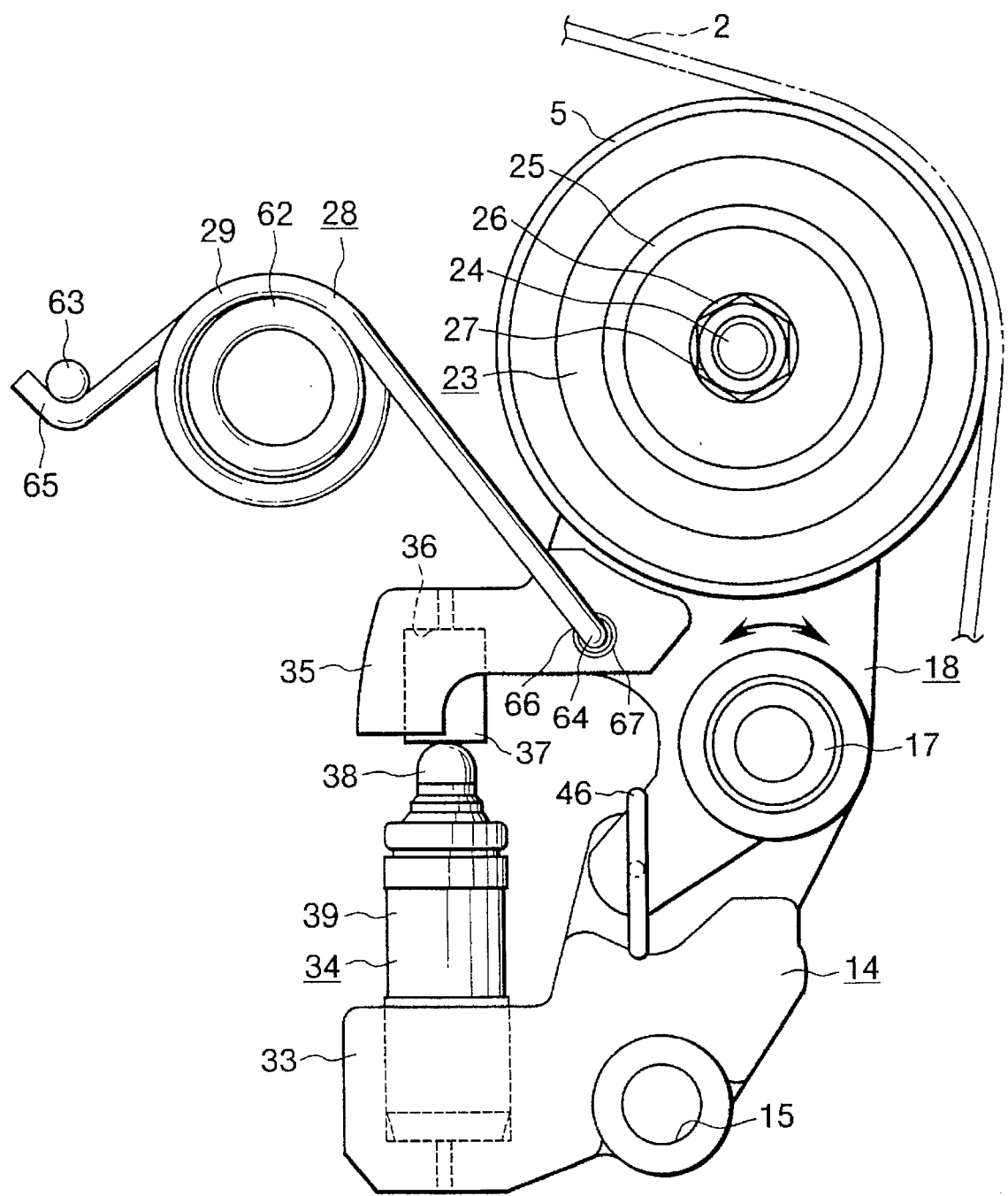
FIG. 19 is a front view of an autotensioner showing a second example of a construction capable of embodying the present invention.
Figure 20:
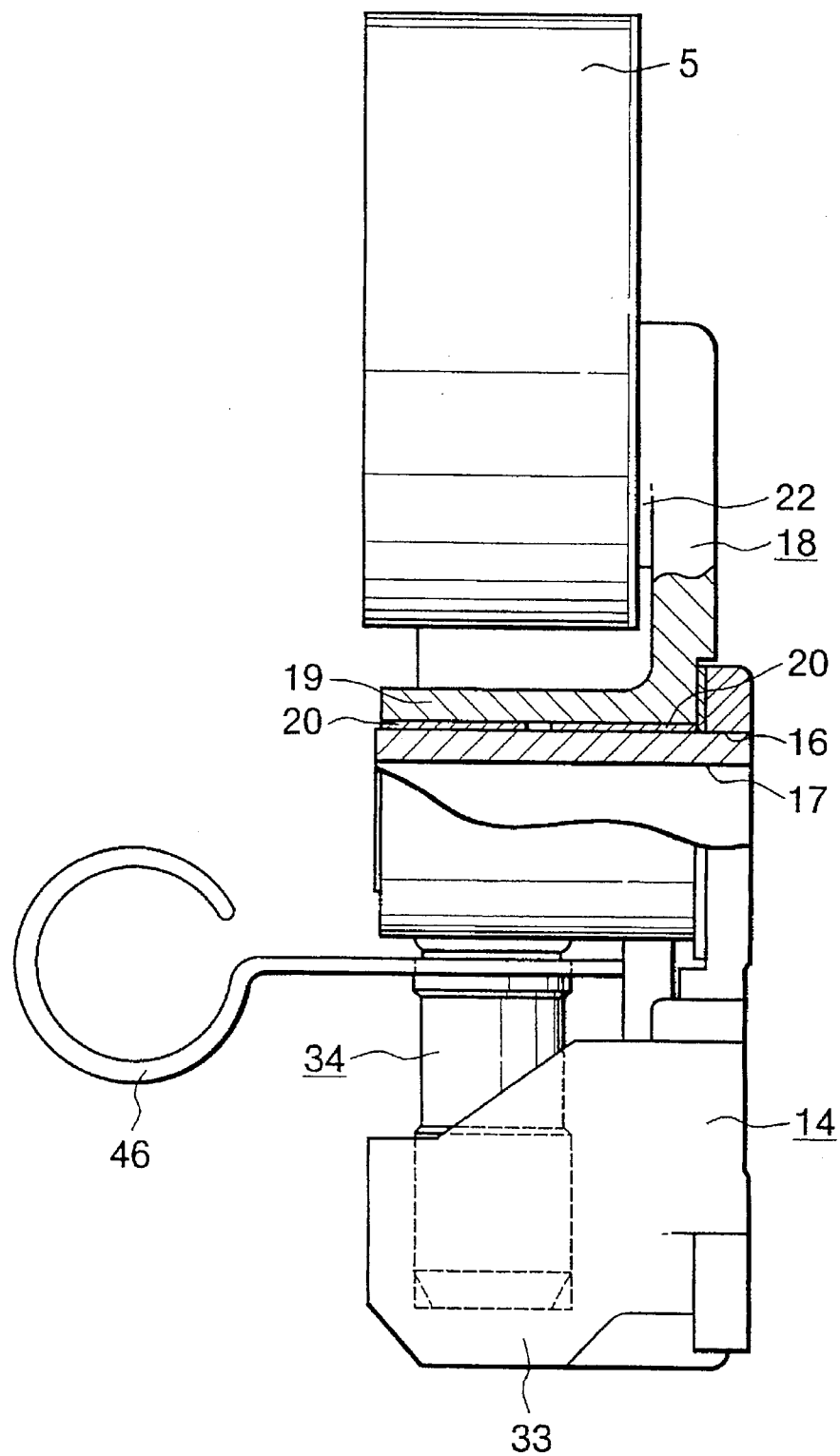
FIG. 20 is a partially cut away side view of FIG. 19.

FIGS. 19 and 20 show a second example of the constructions capable of embodying the present invention. The characteristic of the construction in FIGS. 19 and 20 is that, the installation location for the torsion coil spring 28 is regulated in relation to the swinging member 18 in order to increase the amount of freedom of design of the engine fitted with the autotensioner. The construction and operation of the other parts are similar to the beforementioned conventional construction shown in FIGS. 3 to 5 and hence similar parts are indicated with the same symbol and repeated description is omitted. As follows is a description focusing on the characteristic points of the construction of the second example.

With this construction, a retaining tube 62 is fixed to the front face of the cylinder block on which the autotensioner is mounted, at a location radially outwards from the fixed shaft 17 by an amount more than the size of the swinging member 18 in that direction. This retaining tube 62 is parallel with the fixed shaft 17. An engagement pin 63 is fixed to a portion on the front face of the cylinder block away from the retaining tube 62. The engagement pin 63 also is parallel with the fixed shaft 17.

Instead of fixing the retaining tube 62 and the engagement pin 63 directly to the front face of the cylinder block, an attachment plate to which the retaining tube 62 and engagement pin 63 are fitted, may be fixed to the front face of the cylinder block.

A coil portion 29 of the torsion coil spring 28 is fitted loosely around the periphery of the retaining tube 62. A first engaging portion 64 parallel with the retaining tube 62 is formed in one end of the torsion coil spring 28 (right lower end in FIG. 19), while a second engaging portion 65 bent into an L shape is formed in the other end (left end in FIG. 19). The first engaging portion 64 is inserted into an engaging hole 66 formed in the swinging member 18, while the second engaging portion 65 is engaged with the engagement pin 63. In this condition, a resilient force is applied to the swinging member 18 so as to swing in a clockwise direction in FIG. 19 about the fixed shaft 17.

A sleeve 67 made for example of stainless steel or copper, is internally fitted into the engaging hole 66, and the first engaging portion 64 is inserted into the sleeve 67. This is to prevent the inner peripheral face of the engaging hole 66 formed in the swinging member 18 of aluminum alloy from being worn away by the first engaging portion 64 of spring steel. If the swinging member 18 is made of iron or steel, then this sleeve 67 may be omitted.

With the autotensioner of the second embodiment constructed as described above, since the coil portion 29 of the torsion coil spring 28 is located at a portion separated in a radially outward direction of the fixed shaft 17 from the swinging member 18, then the degree of freedom in assembling the swinging member 18 and the torsion coil spring 28 is increased. That is to say, when as with the conventional construction shown in FIGS. 3 to 5 and the construction of the first example shown in FIGS. 15 to 18, the coil portion 29 of the torsion coil spring 28 is located around the fixed shaft 17, then the assembly location for the torsion coil spring 28 and the swinging member 18 is necessarily determined. In contrast to this, if the coil portion 29 is located at a portion separated from the swinging member 18, then there are a number of possible assembly locations for the torsion coil spring 28 and the swinging member 18.

As a result, installation in a more limited space is possible, giving an increase in the degree of freedom in design of an engine fitted with the autotensioner.

Figure 21:
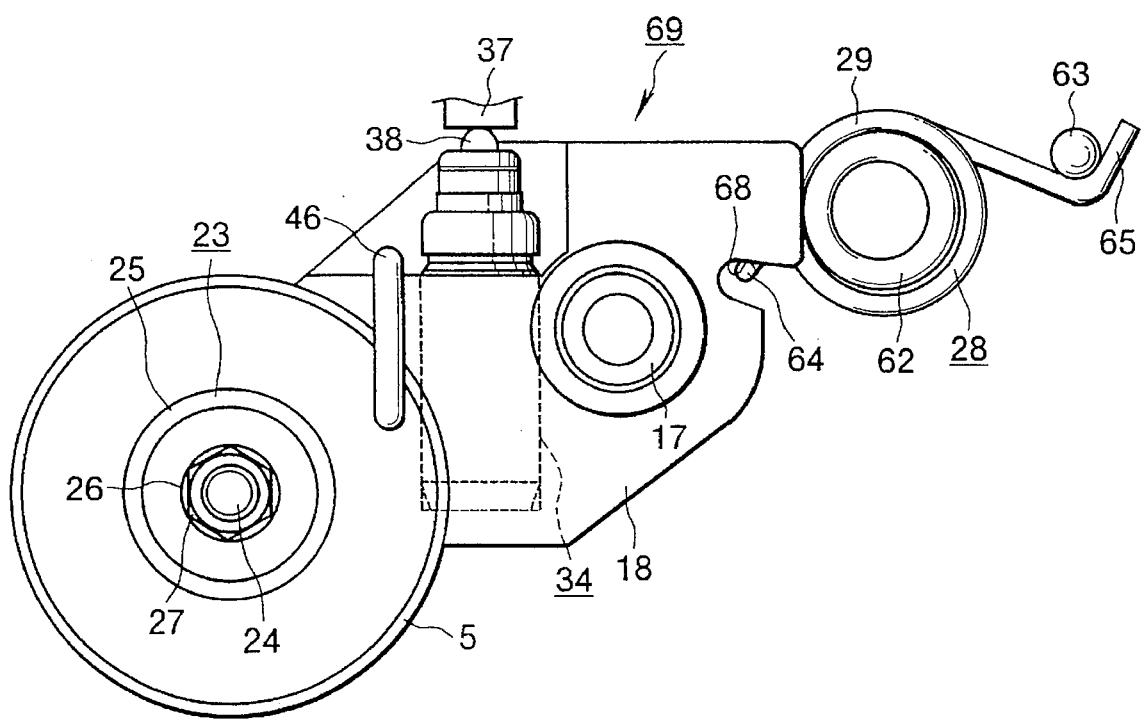
FIG. 21 is a front view of an autotensioner showing a third example of a construction capable of embodying the present invention.

FIG. 21 again shows a third example of the constructions capable of embodying the present invention. With the construction of the third example, the retaining tube 62 for supporting the coil portion 29 of the torsion coil spring 28, is provided on the other side of the pulley 5 with respect to the fixed shaft 17. Furthermore, a cut-out 68 is formed in a part of the swinging member 18, and the first engaging portion 64 of the torsion coil spring 28 is engaged in this cut-out 68. A bearing block 37 is fixed to the front face of an attachment plate 69 together with the retaining tube 62 and the engagement pin 68. A stopper pin 46 spans between the attachment plate 69 and the swinging member 18. Other details of construction and operation are the same as for the abovementioned second embodiment.

FIG. 22 again shown a fourth example of the constructions capable of embodying the present invention. With the construction of the fourth example, the fixed shaft 17 and the bearing block 37 (see FIG. 21) are fixed to the front face (upper face in FIG. 22) of an attachment plate 69 fixed to the front face of a cylinder block 70.

The swinging member 18 is pivotably supported on the tip half portion (upper half portion in FIG. 22) of the fixed shaft 17, such that it is externally fitted to a plain bearing, so that it may be retained or removed from the fixed shaft 17 by tightening or removing a bolt 21.

The coil portion 29 of the torsion coil spring 28 is fitted loosely over a boss portion 71 of the attachment plate 69. The boss portion 71 surrounds a base half portion of the fixed shaft 17, with a diameter larger than the tip half portion. The first engaging portion 64 of the torsion coil spring 28 is engaged in an engagement hole formed in the swinging member 18, while the second engaging portion 65 is engaged with an engagement pin 63 fixed to the attachment plate 69.

Figure 22:
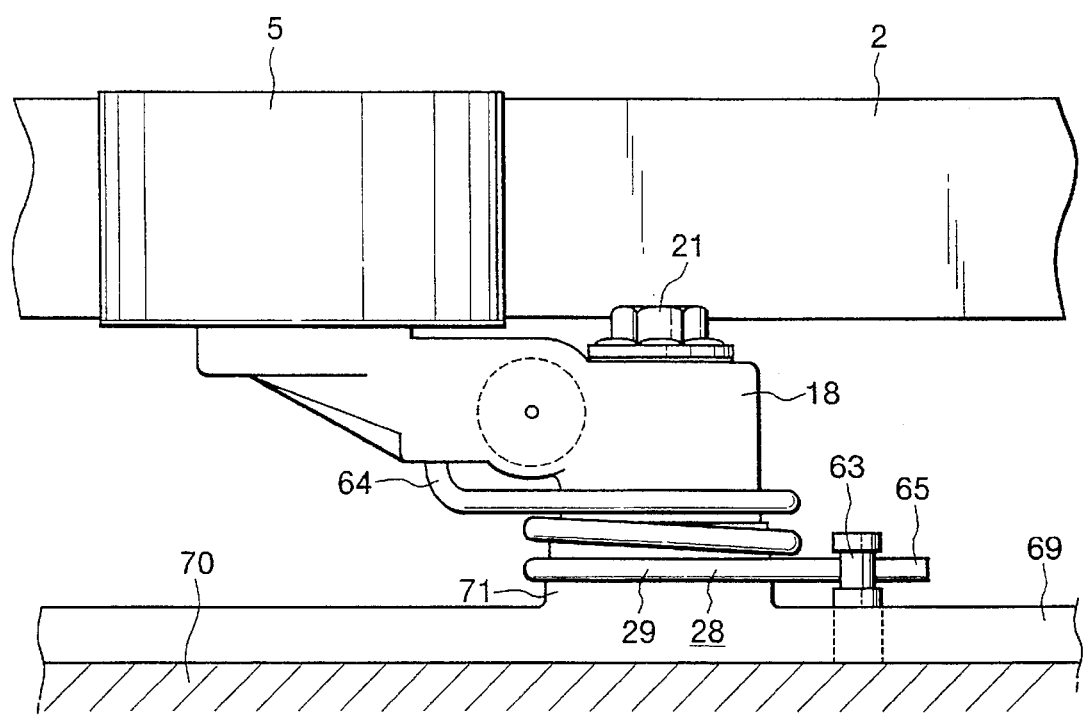
FIG. 22 is a side elevational view of an autotensioner showing a fourth example.

With the construction of the fourth example, the coil portion 29 of the torsion coil spring 28 and the swinging member 18 is provided around the fixed shaft 17 and displaced axially from each other (up/down direction in FIG. 22; in the actual situation, horizontally at right angles to the front face of the cylinder block 70). Therefore even if the coil portion 29 is of large diameter, there is no interference between the coil portion 29 and the swinging member 18. As a result, as with the beforementioned second and third examples, installation in a more limited space is possible, giving an increase in the degree of freedom in design of an engine fitted with the autotensioner.

Figure 23:
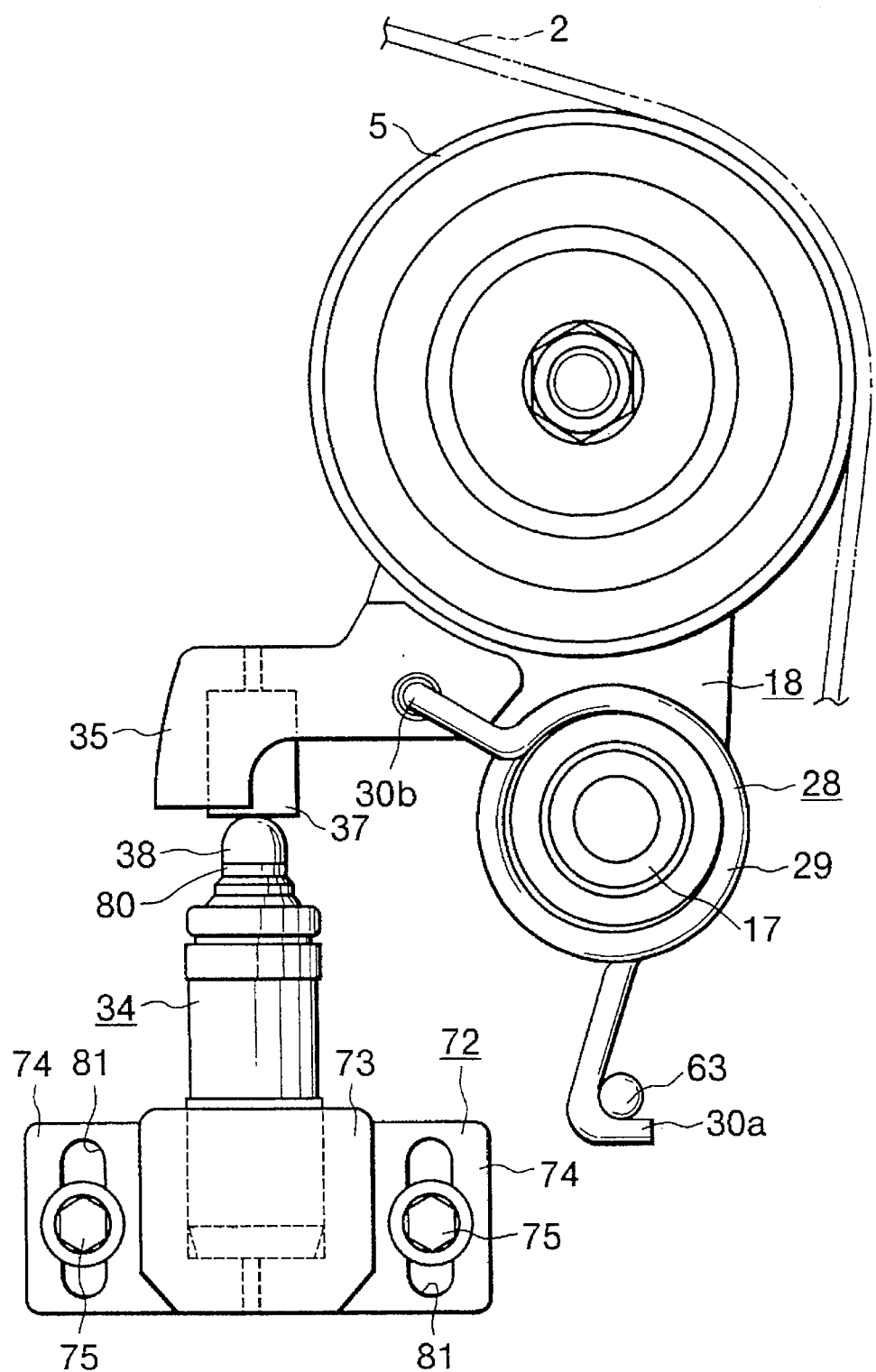
FIG. 23 is a front elevational view of an autotensioner showing a fifth example.
Figure 24:
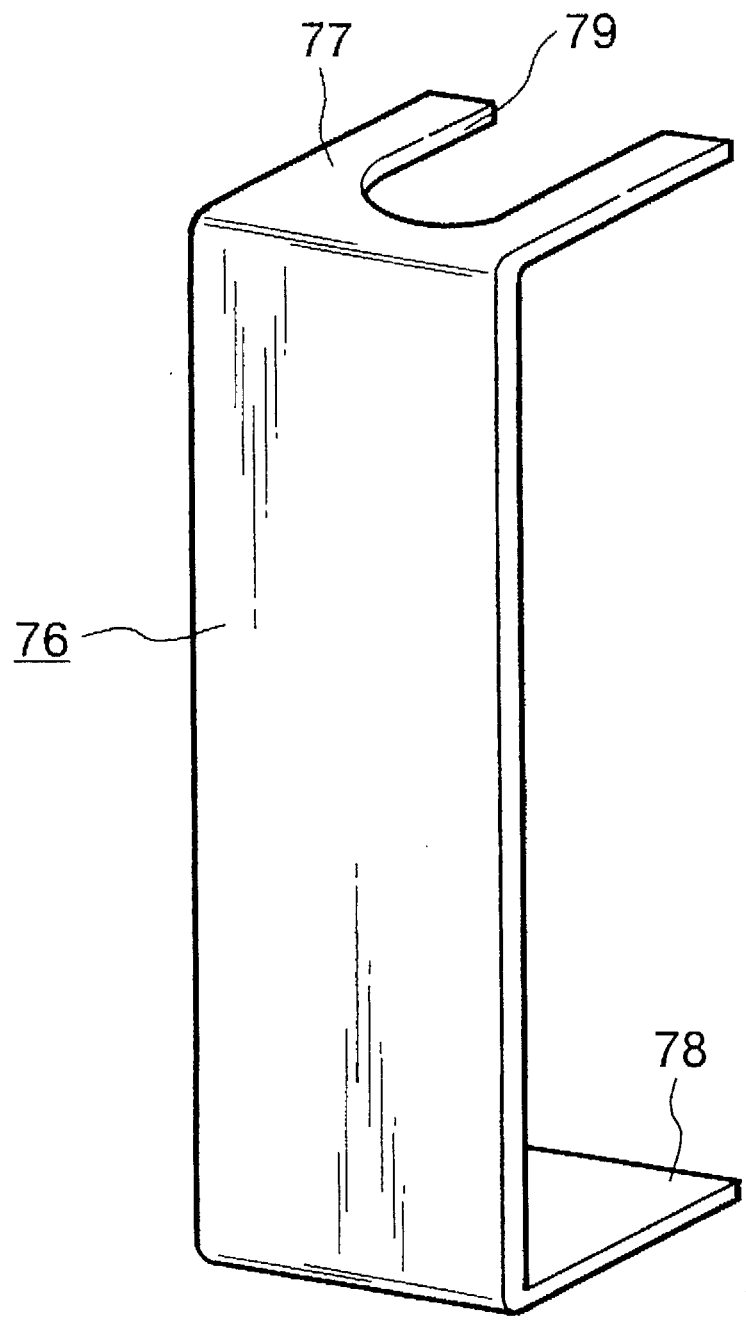
FIG. 24 is a perspective view of a stopper member.

FIGS. 23 and 24 show a fifth example of the constructions capable of embodying the present invention. The characteristic of the construction of this fifth example is that in order for the damper unit 34 to function reliably, the attachment location for the damper unit 34 is made adjustable in the direction of extension and contraction. The construction and operation of the other parts are similar to the beforementioned conventional construction shown in FIGS. 3 to 5 and the construction of the Examples 1 to 4, and hence similar parts are indicated with the same symbol and repeated description is omitted. As follows is a description focusing on the characteristic points of the construction of the fifth example.

The fixed shaft 17 and an engagement pin 63 are supportingly fixed on the front face of the engine cylinder block (fixed portion) either directly or by way of an attachment plate. With the autotensioner of the fifth example, the engagement pin 63 and a holder 72 are provided instead of the fixed member 14 as with the conventional construction shown in FIGS. 3 to 5. Engaging portions 30a, 30b are provided at both ends of the torsion coil spring 28 to apply the tension force. The engaging portion 30a is engaged with the engagement pin 63.

A retaining portion 73 having an upward opening is provided in a central portion of the holder 72, for engagingly supporting the lower end portion of the damper unit 34.

A pair of attachment flanges 74 are provided on both sides of the retaining portion 73. Elongated holes 81 extending in the vertical direction (direction of extension and contraction of the damper unit 34) are formed in the flanges 74.

The holder 72 is fixed to the front face of the engine cylinder block or fixed portion by means of attachment bolts 75 passing through the elongated holes 81, either directly or by way of an attachment plate.

Engine assembly of the autotensioner of the fifth example shown in FIG. 23 and constructed as described above is carried out as follows. At first the timing belt 2 is fitted around the pulley 5 which is pivotally supported on the tip end portion of the swinging member 18. At this time, the swinging member 18 is displaced against the resilient force of the torsion coil spring 28 in the counter clockwise direction of FIG. 23, using an appropriate tool. Then, with the timing belt 2 fitted around the outer peripheral face of the pulley 5, the force applied to the swinging member 18 by the tool is removed, so that the pulley 5 is pressed against the timing belt 2 under the resilient force of the torsion coil spring 28. As a result, a tension corresponding to the resilient force of the torsion coil spring 28 is applied to the timing belt 2 irrespective of any differences in the length of the timing belt 2 due for example to manufacturing errors.

It is also possible to fit the timing belt 2 on the pulley 5 in the state where the engaging portion 30a at one end of the torsion coil spring 28 is not engaged with the engagement pin 63, so that the resilient force due to the torsion coil spring 28 is not applied to the swinging member 18, and then to engage the engaging portion 30a with the engagement pin 63 so that the resilient force is applied to the timing belt 2.

The holder 72 accommodating the bottom end of the damper unit 34, is attached below the swinging arm 35 of the swinging member 18 using the attachment bolts 75. At this time, the damper unit 34 is fitted in the fully contracted condition using a stopper member 76 such as shown in FIG. 24. The stopper member 76 is made by bending opposite ends of a metal plate of sufficient rigidity, at right angles in the same direction to give an upper plate 77 and lower plate 78, with a cut out 79 formed in the upper plate 77. When using the stopper member 76, the bottom plate 78 is abutted against the lower face of the holder 72 at the same time that the cut-out 79 is engaged with the neck portion 80 of the plunger 38 of the damper unit 34, so that the damper unit 34 is held in a fully contracted condition.

Then in the state where the pulley 5 is pressed against the timing belt 2 by the resilient force of the torsion coil spring 28, so that damper unit 34 is contracted in the fully contracted condition, the attachment location of the holder 72 is adjusted so that the upper end portion of the plunger 38 is abutted against the lower face of the bearing block 37 supported on the swinging arm 35. At this time, the attachment bolts 75 are left in the untightened condition. Accordingly, the vertical location of the holder 72 and the damper unit 34 can be freely adjusted by the amount of free movement of the attachment bolts 75 along the elongated holes 81, enabling the upper end of the plunger 38 and the lower face of the bearing block 37 to be positively abutted together.

With the upper end of the plunger 38 and the lower face of the bearing block 37 abutted together in this way, the attachment bolts 75 are tightened to thereby fix the holder 72 to the front face of the cylinder block. After tightening the attachment bolts 75, the stopper member 76 is removed. With removal of the stopper member 76, the plunger 38 of the damper unit 34 rises under the resilient force of the biasing spring 41 (FIG. 6), so that the upper end of the plunger 38 is pressed against the lower face of the bearing block 37 under the resilient force of the biasing spring 41.

As mentioned above, the upper end of the plunger 38 and the lower face of the bearing block 37 are abutted together when the pulley 5 presses against the timing belt 2. Accordingly, when the stopper member 76 is removed, the damper unit 34 tends to extend and is thus reliably braced between the bearing block 37 provided on the swinging member 18, and the fixed portion or holder 72 fixed to the front face of the cylinder block.

Figure 25:
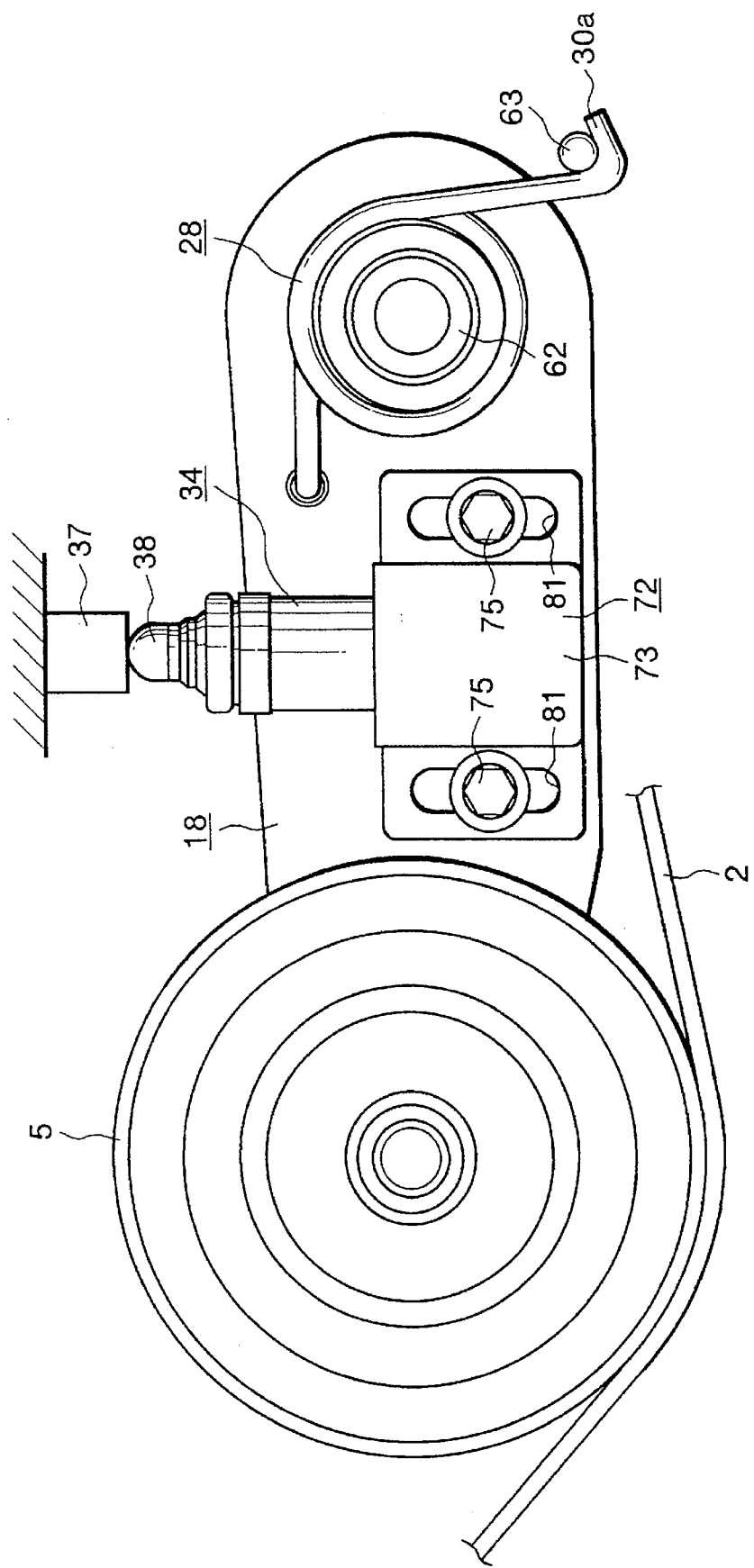
FIG. 25 is a front elevational view of an autotensioner showing a sixth example capable of embodying the present invention.

FIG. 25 again shows a construction a sixth example of the constructions capable of embodying the present invention. With the construction of the sixth example, the holder 72 is fixed to the swinging member 18 by means of the attachment bolts 75 passing through the pair of elongated holes 81 on the left and right sides of the holder 72, while the bearing block 37 is fixed to the front face of the cylinder block. Other details of construction and operation are the same as for the abovementioned fifth example.

With the conventional construction shown in FIGS. 3 to 5, and the abovementioned examples, the cylindrical portion 19 of the swinging member 18 is externally fitted to the non rotating, fixed shaft 17, so that the swinging member 18 is swung or pivoted with rotation of the cylindrical portion 19. However, an opposite construction to this can be adopted. That is to say, a shaft can be fixed to the swinging member 18, and a cylindrical portion fixed to the fixed portion or fixed member 14, so that the swinging member 18 is swung or pivoted with rotation of the shaft.

Since the autotensioner of the present invention is constructed and used as described above, sufficient damper performance can be maintained, and oscillations of the timing belt effectively prevented. Moreover, the life of the timing belt can be sufficiently maintained. Furthermore, small size construction is possible, enabling the unit to be installed in the limited space of the engine cylinder block, so that the degree of freedom in engine design is improved.

What is claimed is:

1. An autotensioner for applying a proper tension to a timing belt in a vehicle engine, comprising:
   a first shaft supported on a fixed portion directly or by way of a fixed member fixed to the fixed portion,
   a swinging member freely swinging about the first shaft,
   a second shaft provided parallel to the first shaft and on one part of the swinging member separated from the first shaft,
   a pulley supported so as to be freely rotatable about the second shaft,
   a tensioning spring provided between the fixed portion or the fixed member and the swinging member, for applying a resilient force to the swinging member to press the pulley towards a timing belt, and
   a damper unit provided between the fixed portion or fixed member and the swinging member, for providing a resistance to displacement of the swinging member against the resilient force of the tensioning spring,
   the damper unit comprising a cylinder in which viscous liquid is sealed, a piston having axial end faces and fitted inside the cylinder so as to be movable in an axial direction thereof, a biasing spring provided between the piston and the cylinder for biasing the piston in one direction, a plunger which protrudes increasingly from the cylinder with displacement of the piston under a resilient force of the biasing spring, an oil passage for communicating both of the axial end faces of the piston with each other, and a check valve provided in series with the oil passage and adapted to open only when the piston is displaced under the resilient force of the biasing spring,
   the tensioning spring provided outside of the cylinder,
   the autotensioner having the following dimensional relationships wherein
   r represents an inner diameter (mm) of the cylinder,
   d represents an outer diameter (mm) of the piston,
   h represents a leak gap width (mm) between the cylinder and the piston, wherein the width (h) of the leak gap is half the difference between the inner diameter (r) of the cylinder and the outer diameter (d) of the piston, that is h=(r−d)/2,
   $m_1$ represents a total swinging inertial mass (kg) of the swinging member and members which swing together with the swinging member,
   $m_2$ represents a total inertial mass (kg) of the members which move axially inside the cylinder with extension and contraction of the damper unit,
   ν represents the kinematic viscosity (mm$^2$/s) of the viscous liquid under operating conditions of the autotensioner,
   ρ represents the density (kg/mm$^3$) of the viscous liquid under the operating conditions of the autotensioner,
   L represents an axial length (mm) of the small leak gap existing between the inner peripheral face of the cylinder and the outer peripheral face of the piston,
   $K_1$ represents the spring constant (kg/s$^2$) of the tensioning spring,
   $K_2$ represents the spring constant (kg/s$^2$) of the biasing spring,
   $B_1$, $B_2$, $B_4$ represent movement direction coefficients for displacement between the pulley and the damper unit, related to the swinging member,
   $B_3$ represents a movement direction coefficient for displacement between the pulley and the tensioning spring, related to the swinging member,
   a represents a half amplitude (kg·mm/s$^2$) of fluctuations in the input load to the pulley, accompanying tension fluctuations in the timing belt under operating conditions,
   f represents a frequency (Hz) of the oscillations of the timing belt which is most detrimental under operating conditions,
   t represents time (s),
   x represents displacement (mm) of the pulley accompanying oscillations in the timing belt, dx/dt represents displacement velocity (mm/s) of the pulley accompanying oscillations in the timing belt, $d^2x/dt^2$ represents displacement acceleration (mm/s²) of the pulley accompanying oscillations in the timing belt, y represents the amplitude of the pulley displacement (mm) accompanying the oscillations in the timing belt, $h_1$ represents the value of h (mm) if (y/2) is 0.7 mm, $h_2$ represents the value of h (mm) if (y/2) is 0.05 mm, and the leak gap width (h) satisfies the following equation:

$$(m_1+B_1m_2)d^2x/dt^2+B_2\{(3\pi\nu\rho Ld^3)/4h^3\}dx/dt+(B_3K_1+B_4K_2)x=a\sin(2\pi ft)$$

and is between ($h_1$) and ($h_2$) and equal to or greater than 0.002 mm.

2. The autotensioner of claim 1, wherein the engine has a cylinder block with a front face, the fixed portion is provided on the front face of the cylinder block, the fixed member has a fixed arm portion which is fixed to the fixed portion on the front face of the cylinder block at a position separated from the first shaft, the swinging member has a cylindrical portion fitted onto the first shaft and a swinging arm portion spaced away from the second shaft, and the damper unit is provided between the fixed arm portion of the fixed member and the swinging arm portion of the swinging member.

3. The autotensioner of claim 2, wherein the fixed member has an engaging hole between the first shaft and the fixed arm portion, the swinging member has an engaging hole between the second shaft and the swinging arm portion, and the tensioning spring is a torsion coil spring having a coil portion provided in the cylindrical portion of the swinging member, a first engagement portion secured in the engaging hole of the swinging member and a second engagement portion secured in the engaging hole of the fixed member.

4. The autotensioner of claim 2, wherein the tensioning spring is a torsion coil spring which has a coil portion spaced away from the swinging member radially outwards with reference to the first shaft.

5. The autotensioner of claim 4, wherein the swinging member has an engaging hole between the second shaft and the swinging arm portion, the tensioning spring has a first engagement portion secured by the engaging hole of the swinging member, a second engagement portion secured by an engaging pin provided in the fixed portion of the cylinder block, and a coil portion provided in a support tube provided in the fixed portion of the cylinder block.

6. The autotensioner of claim 4, wherein the swinging member has a cutout, and the tensioning spring has a first engagement portion secured by the cutout of the swinging member, a second engagement portion secured by an engaging pin provided in the fixed portion of the cylinder block, and a coil portion provided in a support tube on the opposite side of the pulley with reference the first shaft of the fixed portion of the cylinder block.

7. The autotensioner of claim 1, wherein the engine has a cylinder block with a front face, so that the fixed portion is provided on the front face of the cylinder block, the first shaft is a bolt and secured directly to the fixed portion on the front face of the cylinder block, the swinging member comprises a cylindrical portion fitted onto the first shaft, a swinging arm portion spaced away from the second shaft, and an engaging hole provided between the second shaft and the swinging arm portion, the tensioning spring is a torsion coil spring, and comprises a coil portion disposed in the cylindrical portion of the swinging member, a first engagement portion secured in the engaging hole formed in the first portion of the cylinder block, and a second engagement portion secured in the engaging hole of the swinging member, and the damper unit is provided between the fixed portion of the cylinder block and the swinging arm portion of the swinging member.

8. The autotensioner of claim 1, wherein the engine has a cylinder block with a front face, so that the fixed portion provided on the front face of the cylinder block, the first shaft is securely supported on the front face of the cylinder block of the engine, the damper unit is provided between the fixed portion and the swinging member, and supported by a holder securely supported by the swinging member or the fixed member, and the holder has a long hole elongated in the extension and contraction directions of the damper unit, and tightened by a mounting bolt passing through the long hole.

9. An autotensioner for applying a proper tension to a timing belt in a vehicle engine having a cylinder block with a front face and a fixed portion on the front face, comprising;

a fixed member fixed to the fixed portion having a first shaft and a fixed arm portion spaced apart from the first shaft, a swinging member freely swinging about the first shaft having a cylindrical portion fitted onto the first shaft, a second shaft provided parallel to the first shaft and space from the first shaft, and a swinging arm portion spaced from the second shaft, a pulley supported so as to be freely rotatable about the second shaft, a tensioning spring provided between the fixed portion or the fixed member and the swinging member, for applying a resilient force to the swinging member to press the pulley towards a timing belt, and a damper unit provided between the fixed arm portion of the fixed member and the swinging arm portion of the swinging member, for providing a resistance to displacement of the swinging member against the resilient force of the tensioning spring, the damper unit comprising a cylinder in which viscous liquid is sealed, a piston having axial end faces and fitted inside the cylinder so as to be movable in an axial direction thereof, a biasing spring provided between the piston and the cylinder for biasing the piston in one direction, a plunger which protrudes increasingly from the cylinder with displacement of the piston under a resilient force of the biasing spring, an oil passage for communicating both of the axial end faces of the piston, and a check valve provided in series with the oil passage and adapted to open only when the piston is displaced under the resilient force of the biasing spring, the tensioning spring provided outside of the cylinder, the autotensioner having the following dimensional relationships wherein r represents an inner diameter (mm) of the cylinder, d represents an outer diameter (mm) of the piston, h represents a leak gap width (mm) between the cylinder and the piston, wherein the width (h) of the leak gap is half the difference between the inner diameter (r) of the cylinder and the outer diameter (d) of the piston, that is h=(r−d)/2

$m_1$ represents a total swinging inertial mass (kg) of the swinging member and members which swing together with the swinging member, $m_2$ represents a total inertial mass (kg) of the members which move axially inside the cylinder with extension and contraction of the damper unit, ν represents the kinematic viscosity (mm²/s) of the viscous liquid under operating conditions of the autotensioner, ρ represents the density (kg/mm³) of the viscous liquid under the operating conditions of the autotensioner, L represents an axial length (mm) of the small leak gap existing between the inner peripheral face of the cylinder and the outer peripheral face of the piston, $K_1$ represents the spring constant (kg/s²) of the tensioning spring, $K_2$ represents the spring constant (kg/s²) of the biasing spring, $B_1$, $B_2$, $B_4$, represent movement direction coefficients for displacement between the pulley and the damper unit, related to the swinging member, $B_3$ represents a movement direction coefficient for displacement between the pulley and the tensioning spring, related to the swinging member, a represents a half amplitude (kg·mm/s²) of fluctuations in the input load to the pulley, accompanying tension fluctuations in the timing belt under operating conditions, f represents a frequency (Hz) of the oscillations of the timing belt which is most detrimental under operating conditions, t represents time (s), x represents displacement (mm) of the pulley accompanying oscillation in the timing belt, dx/dt represents displacement velocity (mm/s) of the pulley accompanying oscillations in the timing belt, $d^2x/dt^2$ represents displacement acceleration (mm/s²) of the pulley accompanying oscillations in the timing belt, y represents the amplitude of the pulley displacement (mm) accompanying the oscillations in the timing belt, $h_1$ represents the value of h (mm) if (y/2) is 0.7 mm, $h_2$ represents the value of h (mm) if (y/2) is 0.05 mm, and the leak gap width (h) satisfies the following equation:

$$(m_1+B_1m_2)d^2x/dt^2+B_2\{(3\pi\nu\rho Ld^3)/4H_i^3\}dx/dt+(B_3K_1+B_4K_2)x=a \sin(2\pi ft)$$

and is between ($h_1$) and ($h_2$) and equal to or greater than 0.002 mm.

10. The autotensioner of claim 9, wherein the fixed member has an engaging hole between the first shaft and the fixed arm portion, and the swinging member has an engaging hole between the second shaft and the swinging arm portion, and the tensioning spring is a torsion coil spring having a coil portion provided in the cylindrical portion of the swinging member, a first engagement portion secured in the engaging hole of the swinging member and a second engagement portion secured in the engaging hole of the fixed member.

11. The autotensioner of claim 9, wherein the tensioning spring is a torsion coil spring which has a coil portion spaced away from the swinging member radially outwards with reference to the first shaft.

12. The autotensioner of claim 11, wherein the swinging member has an engaging hole between the second shaft and the swinging arm portion, the tensioning spring has a first engagement portion secured by the engaging hole of the swinging member, a second engagement portion secured by an engaging pin provided in the fixed portion of the cylinder block, and a coil portion provided in a support tube provided in the fixed portion of the cylinder block.

13. The autotensioner of claim 11, wherein the swinging member has a cutout, and the tensioning spring has a first engagement portion secured by the cutout of the swinging member, a second engagement portion secured by an engaging pin provided in the fixed portion of the cylinder block, and a coil portion provided in a support tube on the opposite side of the pulley with reference the first shaft of the fixed portion of the cylinder block.

* * * * *